United States Patent
Tietz et al.

(10) Patent No.: US 10,237,198 B2
(45) Date of Patent: Mar. 19, 2019

(54) SHARED-CREDIT ARBITRATION CIRCUIT

(71) Applicant: Hewlett Packard Enterprise Development LP, Houston, TX (US)

(72) Inventors: Joseph G. Tietz, Tinton Falls, NJ (US); Russell L. Nicol, Eau Claire, WI (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/370,529

(22) Filed: Dec. 6, 2016

(65) Prior Publication Data

US 2018/0159789 A1    Jun. 7, 2018

(51) Int. Cl.
| | |
|---|---|
| *H04L 12/801* | (2013.01) |
| *H04L 12/873* | (2013.01) |
| *H04L 12/931* | (2013.01) |

(52) U.S. Cl.
CPC ............ *H04L 47/527* (2013.01); *H04L 47/39* (2013.01); *H04L 49/70* (2013.01)

(58) Field of Classification Search
CPC ........ H04L 47/527; H04L 49/70; H04L 47/39
See application file for complete search history.

(56) References Cited

U.S. PATENT DOCUMENTS

| | | | |
|---|---|---|---|
| 4,499,578 A | 2/1985 | Marouf et al. | |
| 4,644,496 A | 2/1987 | Andrews | |
| 5,151,900 A | 9/1992 | Snyder et al. | |
| 5,267,235 A | 11/1993 | Thacker | |
| 5,386,413 A | 1/1995 | McAuley et al. | |
| 5,649,108 A | 7/1997 | Spiegel et al. | |
| 5,659,796 A | 8/1997 | Thorson et al. | |
| 5,701,416 A | 12/1997 | Thorson et al. | |
| 5,732,087 A | 3/1998 | Lauer et al. | |
| 6,092,137 A | 7/2000 | Huang et al. | |
| 6,101,552 A | 8/2000 | Chiang et al. | |

(Continued)

FOREIGN PATENT DOCUMENTS

WO    00/13092 A2    3/2000

OTHER PUBLICATIONS

Manchanda et al., *Non-Uniform Memory Access (NUMA)*, New York University, http://www.cs.nyu.edu/~lerner/spring10/projects/NUMA.pdf , 4 pages, 2010.

(Continued)

*Primary Examiner* — Brian D Nguyen
(74) *Attorney, Agent, or Firm* — Mannava & Kang, P.C.

(57) ABSTRACT

This patent application relates generally to a shared-credit arbitration circuit for use in arbitrating access by a number of virtual channels to a shared resource managed by a destination (arbiter) based on credits allotted to each virtual channel, in which only the destination is aware of the availability of a shared pool of resources, and the destination selectively provides access to the shared pool by the virtual channels and returns credits to the source(s) associated with the virtual channels when shared resources are used so that the source(s) are unaware of the destination's use of the shared resources and are unhindered by the destination's use of shared resources. Among other things, this can significantly reduce the complexity of the source(s) and the required handshaking between the source(s) and the destination.

21 Claims, 20 Drawing Sheets

(56) References Cited

U.S. PATENT DOCUMENTS

| | | | |
|---|---|---|---|
| 6,147,976 A | 11/2000 | Shand et al. |
| 6,167,437 A | 12/2000 | Stevens et al. |
| 6,195,703 B1 | 2/2001 | Blumenau et al. |
| 6,216,167 B1 | 4/2001 | Momirov |
| 6,272,112 B1 | 8/2001 | Orita |
| 6,415,361 B1 | 7/2002 | Moh et al. |
| 6,687,756 B1 | 2/2004 | Rawson, III |
| 6,691,165 B1 | 2/2004 | Bruck et al. |
| 6,721,816 B1 | 4/2004 | Magro et al. |
| 6,804,233 B1 | 10/2004 | Congdon et al. |
| 6,839,794 B1 | 1/2005 | Schober |
| 7,177,946 B1 | 2/2007 | Kaluve et al. |
| 7,209,476 B1 | 4/2007 | Colloff et al. |
| 7,395,346 B2 | 7/2008 | Pinder et al. |
| 7,512,705 B2 | 3/2009 | Mogul |
| 7,581,021 B2 | 8/2009 | Errickson et al. |
| 7,593,336 B2 | 9/2009 | Varanasi et al. |
| 7,707,635 B1 | 4/2010 | Kuo et al. |
| 8,077,602 B2 | 12/2011 | Arimilli et al. |
| 8,081,646 B1 | 12/2011 | Bishop et al. |
| 8,693,485 B2 | 4/2014 | Kotha et al. |
| 8,706,893 B2 | 4/2014 | Even et al. |
| 8,767,587 B1 | 7/2014 | Finn et al. |
| 9,237,093 B2 | 1/2016 | Tietz et al. |
| 9,866,467 B1 | 1/2018 | Barnum et al. |
| 2002/0039364 A1 | 4/2002 | Kamiya et al. |
| 2002/0194182 A1 | 12/2002 | Fujita et al. |
| 2003/0106052 A1 | 6/2003 | Morrison et al. |
| 2004/0228326 A1 | 11/2004 | Pearson |
| 2005/0102477 A1 | 5/2005 | Sukegawa |
| 2005/0108444 A1 | 5/2005 | Flauaus et al. |
| 2005/0228926 A1 | 10/2005 | Smith et al. |
| 2005/0228952 A1 | 10/2005 | Mayhew et al. |
| 2006/0047907 A1 | 3/2006 | Shiga et al. |
| 2006/0187849 A1 | 8/2006 | Hamedi |
| 2007/0050563 A1 | 3/2007 | Alsup |
| 2007/0064699 A1 | 3/2007 | Bernick et al. |
| 2007/0079045 A1 | 4/2007 | Luke |
| 2007/0091911 A1 | 4/2007 | Watanabe et al. |
| 2007/0133415 A1* | 6/2007 | Spink ............... H04L 47/10 370/235 |
| 2007/0185682 A1 | 8/2007 | Eidson |
| 2008/0037544 A1 | 2/2008 | Yano et al. |
| 2009/0013069 A1 | 1/2009 | Gobara et al. |
| 2009/0190588 A1 | 7/2009 | Eder et al. |
| 2009/0210711 A1 | 8/2009 | Moskowitz |
| 2009/0260083 A1 | 10/2009 | Szeto et al. |
| 2010/0125683 A1 | 5/2010 | Soeda et al. |
| 2010/0217949 A1 | 8/2010 | Schopp et al. |
| 2011/0047439 A1 | 2/2011 | Jorda et al. |
| 2011/0066753 A1 | 3/2011 | Wang et al. |
| 2011/0134797 A1 | 6/2011 | Banks et al. |
| 2011/0149986 A1 | 6/2011 | Sugawara |
| 2011/0179208 A1 | 7/2011 | Koka et al. |
| 2011/0213928 A1 | 9/2011 | Grube et al. |
| 2012/0047310 A1 | 2/2012 | Satpathy et al. |
| 2012/0072635 A1 | 3/2012 | Yoshida et al. |
| 2013/0021910 A1 | 1/2013 | Crisan et al. |
| 2013/0051397 A1 | 2/2013 | Guo et al. |
| 2013/0246715 A1 | 9/2013 | Miyauchi |
| 2013/0250792 A1 | 9/2013 | Yoshida et al. |
| 2014/0052838 A1 | 2/2014 | Giacomoni et al. |
| 2014/0146666 A1 | 5/2014 | Kwan et al. |
| 2014/0241443 A1 | 8/2014 | Nowick et al. |
| 2014/0359195 A1 | 12/2014 | Nishiyashiki |
| 2015/0089053 A1 | 3/2015 | Harper et al. |
| 2015/0172196 A1 | 6/2015 | Godbole et al. |
| 2016/0112282 A1 | 4/2016 | Rochon |
| 2016/0127191 A1* | 5/2016 | Nair ................. H04L 41/12 709/224 |
| 2016/0188469 A1* | 6/2016 | Nagarajan ........ G06F 12/0815 710/308 |
| 2016/0191420 A1* | 6/2016 | Nagarajan ........ H04L 45/7453 370/389 |
| 2016/0196233 A1* | 7/2016 | Chen ............... G06F 13/4291 710/106 |
| 2016/0266898 A1 | 9/2016 | Kitamura |
| 2016/0292123 A1 | 10/2016 | Higuchi |
| 2016/0292423 A1 | 10/2016 | Yao et al. |
| 2016/0295624 A1* | 10/2016 | Novlan ............. H04W 76/14 |
| 2016/0345307 A1* | 11/2016 | Huang ............. H04W 52/0216 |
| 2017/0086151 A1 | 3/2017 | Chen et al. |
| 2017/0318335 A1* | 11/2017 | Ding ............... H04N 21/442 |

OTHER PUBLICATIONS

Wikipedia.org, *Non-Uniform Memory Access*, http://en.wikipedia.org/wiki/Non-Uniform_Memory_Access, 4 pages, Feb. 22, 2013.
Wikipedia.org, *Uniform Memory Access*, http://en.wikipedia.org/wiki/Uniform_Memory_Access, 1 page, Mar. 8, 2013.
Tietz, J. G., et al.; "Non-Final Office Action cited in U.S. Appl. No. 15/370,508"; dated Mar. 28, 2018; 29 pages.
Non-Final Office Action received for U.S. Appl. No. 15/370,545, dated Nov. 1, 2018, 8 pages.
Non-Final Office Action Received for U.S. Appl. No. 15/370,508, dated Oct. 16, 2018, 20 pages.
Non-Final Office Action received for U.S. Appl. No. 15/370,485, dated Aug. 23, 2018, 15 pages.
Abeyratne, Sandunmalee, Nilmini, "Studies in Exascale Computer Architecture: Interconnect, Resiliency, and Checkpointing", A dissertation submitted in partial fulfillment of the requirements for the degree of Doctor of Philosophy (Computer Science and Engineering) in The University of Michigan, 2017, 153 pages.

\* cited by examiner

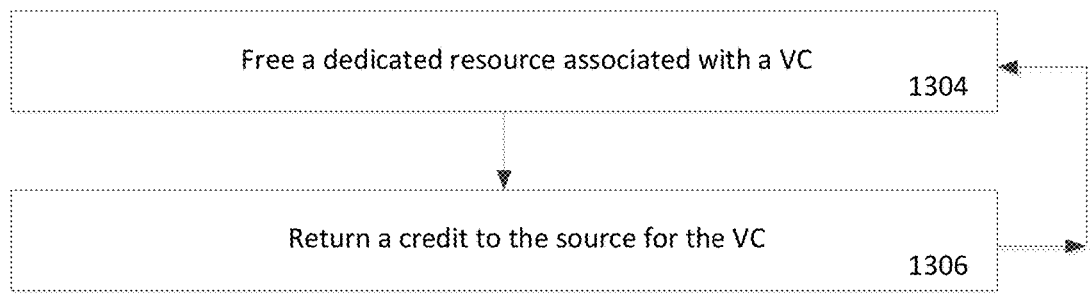
FIG. 14    1400
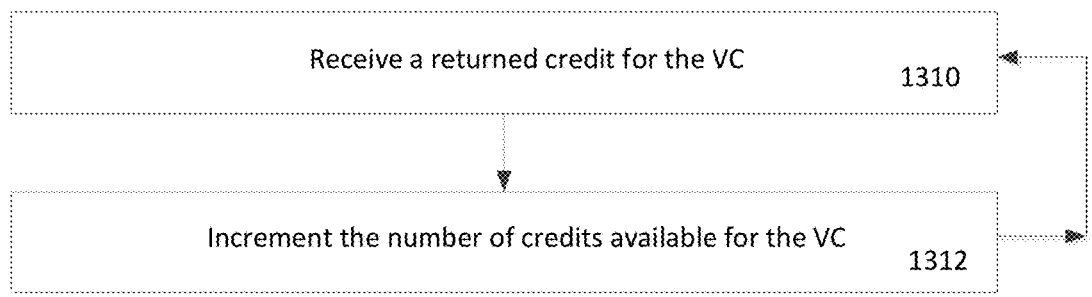
FIG. 15    1500

FIG. 17    1700

| Index | Source Mask | Priority | Count | Done | Description |
|---|---|---|---|---|---|
| 0 | 11111 | 00001 | 1 | 0 | RR for source 0 for one grant |
| 1 | 11111 | 00010 | 1 | 0 | RR for source 1 for one grant |
| 2 | 11111 | 00100 | 1 | 0 | RR for source 2 for one grant |
| 3 | 11111 | 01000 | 1 | 0 | RR for source 3 for one grant |
| 4 | 11111 | 10000 | 2 | 0 | RR for source 4 for two grants |
| 5 | 11110 | 00000 | 4 | 0 | Aging on Source 1 - 4 for four grants |
| 6 | 00001 | 00000 | 1 | 1 | Source 0 wins (if pending) |
| ... | | | | | |
| n | xxxxx | xxxxx | x | x | Not Used |

SHARED-CREDIT ARBITRATION CIRCUIT

CROSS-REFERENCE TO RELATED APPLICATION(S)

This patent application is related to the following U.S. patent applications, each of which is hereby incorporated herein by reference in its entirety:

U.S. patent application Ser. No. 15/370,485 entitled PREDICTIVE ARBITRATION CIRCUIT;

U.S. patent application Ser. No. 15/370,508 entitled AGE-BASED ARBITRATION CIRCUIT; and U.S. patent application Ser. No. 15/370,545 entitled SCRIPTED ARBITRATION CIRCUIT.

FIELD OF THE INVENTION

The invention generally relates to a shared credit buffer access circuit.

BACKGROUND OF THE INVENTION

High-performance computer ("HPC") systems typically include many processors, each with its own local memory. At least some pairs of the processors are interconnected via links to enable each processor to access memory ("non-local memory") of each, or at least some, of the other processors. Some such systems are constructed according to non-uniform memory access ("NUMA") designs, in which access to non-local memory is slower than access to local memory. Because a HPC system may not include a separate link between every pair of processors, some non-local memory accesses are routed through third (or more) processors, thereby traversing multi-hop routes. However, determining routes quickly for each non-local memory access poses problems. Furthermore, congested links or routes retard non-local memory accesses, thereby negatively impacting performance of the affected processor(s).

A crossbar switch is an assembly of individual switches between a set of inputs and a set of outputs. The switches are arranged in a matrix. If the crossbar switch has M inputs and N outputs, then a crossbar has a matrix with M×N crosspoints or places where the connections cross. At each crosspoint is a switch that, when closed, connects one of the inputs to one of the outputs. One exemplary crossbar is a single layer, non-blocking switch in which other concurrent connections do not prevent connecting other inputs to other outputs. Collections of crossbars can be used to implement multiple layer and blocking switches.

A typical crossbar arbitration scheme can make use of various different protocols to flow traffic from competing sources. These algorithms typically include round robin and aging arbitration protocols. Arbiters that are configured to support multiple algorithms are often very complex or make significant comprises in order to meet stringent timing requirements.

SUMMARY OF VARIOUS EMBODIMENTS

In accordance with one embodiment of the invention, an apparatus for providing access by a plurality of virtual channels to a shared resource comprises a shared resource, at least one packet interface providing the plurality of virtual channels, and an arbiter configured to logically divide the shared resource into a plurality of dedicated resource pools and a shared resource pool with each dedicated resource pool associated with a distinct virtual channel, allocate credits to each virtual channel, receive from a source associated with a virtual channel a packet for the virtual channel, determine whether to use the dedicated resource pool associated with the virtual channel or the shared resource pool for the packet, and when the shared resource pool is used for the packet, return a credit back to the source without waiting for the shared resource used for the packet to be freed.

In accordance with another embodiment of the invention, an arbiter for arbitrating access by a plurality of virtual channels to a shared resource comprises at least one packet interface providing the plurality of virtual channels and a shared-credit arbitration circuit configured to logically divide the shared resource into a plurality of dedicated resource pools and a shared resource pool with each dedicated resource pool associated with a distinct virtual channel, allocate credits to each virtual channel, receive from a source associated with a virtual channel a packet for the virtual channel, determine whether to use the dedicated resource pool associated with the virtual channel or the shared resource pool for the packet, and when the shared resource pool is used for the packet, return a credit back to the source without waiting for the packet to be freed from the shared resource pool.

In accordance with another embodiment of the invention, a method for providing access by a plurality of virtual channels to a shared resource comprises logically dividing a shared resource into a plurality of dedicated resource pools and a shared resource pool with each dedicated resource pool associated with a distinct virtual channel, allocating credits to each virtual channel, receiving from a source associated with a virtual channel a packet for the virtual channel, determining whether to use the dedicated resource pool associated with the virtual channel or the shared resource pool for the packet, and when the shared resource pool is used for the packet, returning a credit back to the source without waiting for the packet to be freed from the shared resource pool.

In various alternative embodiments, the virtual channels may be separate physical channels associated with separate packet interfaces or may be logical channels on a single packet interface. The shared resource may be a memory, e.g., a Dynamically Allocated Memory Queue (DAMQ) buffer, and the packets may be data packets to be stored in the memory. Alternatively, the shared resource may be a communication interface, and the packets may be data packets to be transmitted over the communication interface.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

FIG. 14 is a flow chart for returning a credit to the source upon freeing a dedicated resource by the destination arbiter in a shared-credit arbitration circuit, in accordance with various exemplary embodiments.

FIG. 15 is a flow chart for processing a returned credit by the source in a shared-credit arbitration circuit, in accordance with various exemplary embodiments.

DESCRIPTION OF ILLUSTRATIVE EMBODIMENTS

Definitions

Figure 1:
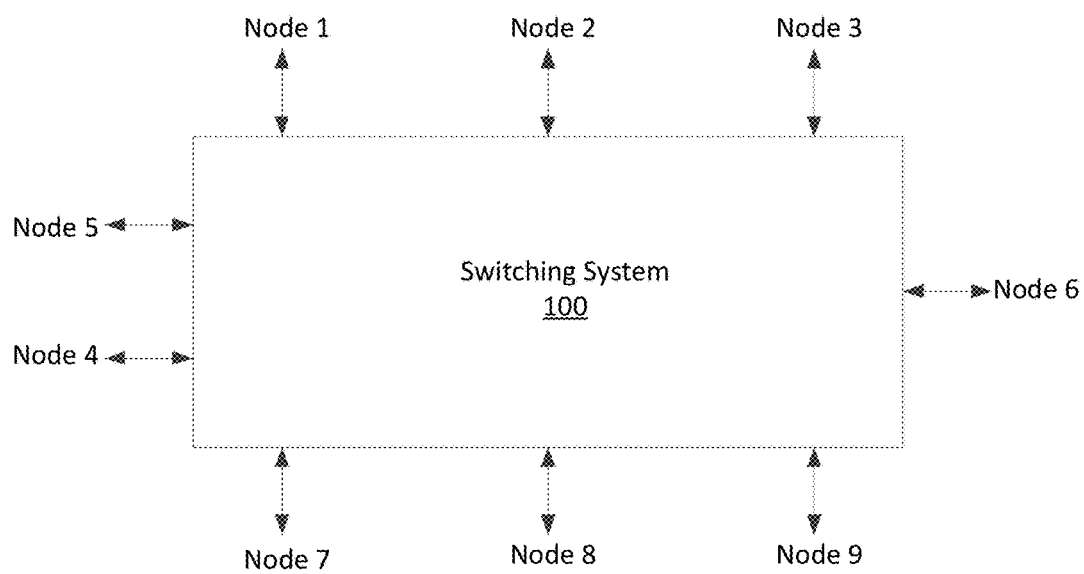
FIG. 1 is a schematic diagram showing an exemplary switching system that is configured to switch or route packets between nodes of a network.

As used herein, the following terms have the following definitions, unless their context indicates otherwise.

A "network" is a communication system in which information can be transmitted unidirectionally and/or bidirectionally between two or more nodes.

A "packet" is a generic name for any unit of information that is processed in a network, switching system, computer, or other system such as for transmitting information or storing information. Unless the context otherwise requires, a packet is not limited to any particular type, format, or protocol. Thus, a packet generally may include, without limitation, a communication protocol message (e.g., a frame, packet, datagram, user datagram, cell, protocol data unit, inter-processor message, etc.), a data representation (e.g., a block, file, object, etc.), or other unit of information including portions thereof. In certain exemplary embodiments, a packet may be a "flit," where a "flit" is a single transmission unit of a communication message (i.e., a communication message may be transmitted as a single flit or may be divided into multiple flits).

A "node" in a network can be any type of device that can send and/or receive packets of information, such as, for example, and without limitation, a computer, a computer processor, a computer memory, a client device, a server device, or a socket, to name but a few. Some networks contain all the same type of nodes (e.g., all the nodes may be computer processors) while other networks contain a mixture of different types of nodes (e.g., some nodes may be computer processors while other nodes may be computer memories).

A "switching system" is an electronic device or group of devices that switches or routes packets of information between two or more nodes in a network. Such switching or routing can be performed based on information contained in the packets of information, such as, for example, a destination address or destination port number.

A "port" is a communication interface of a switching system. Generally speaking, a switching system includes a number of network ports, where each network port is coupled to a corresponding network node. It should be noted that a switching system can be a network node in some network configurations. For example, ports of one switching system can be coupled to ports of other switching systems to establish an internetwork containing multiple switching systems.

A "computer" is an electronic system that includes a memory that stores coded instructions and a processor coupled to the memory and configured to fetch and execute the instructions.

This patent application relates generally to a shared-credit arbitration circuit for use in arbitrating access by a number of virtual channels to a shared resource managed by a destination (arbiter) based on credits allotted to each virtual channel, in which only the destination is aware of the availability of a shared pool of resources, and the destination selectively provides access to the shared pool by the virtual channels and returns credits to the source(s) associated with the virtual channels when shared resources are used so that the source(s) are unaware of the destination's use of the shared resources and are unhindered by the destination's use of shared resources. Among other things, this can significantly reduce the complexity of the source(s) and the required handshaking between the source(s) and the destination.

Various exemplary embodiments are now described with reference to an arbiter in switching system such as a crossbar or matrix switching system, although it should be noted that the present invention is not limited to use in crossbar or matrix switching systems but instead can be used more generally for arbitration in virtually any type of network or switching system including, without limitation, access to any of a wide variety of shared resources such as communication connections, cache memories, or buffers, to name but a few.

FIG. 1 is a schematic diagram showing an exemplary switching system 100 that is configured to switch or route packets between nodes of a network. In this example, the switching system 100 is configured to switch or route packets between nine nodes (for convenience, numbered 1 through 9), although it should be noted that switching systems generally can be configured to support any number of nodes. Generally speaking, any node can send packets of information to and receive packets of information from any other node in the network.

Figure 2:
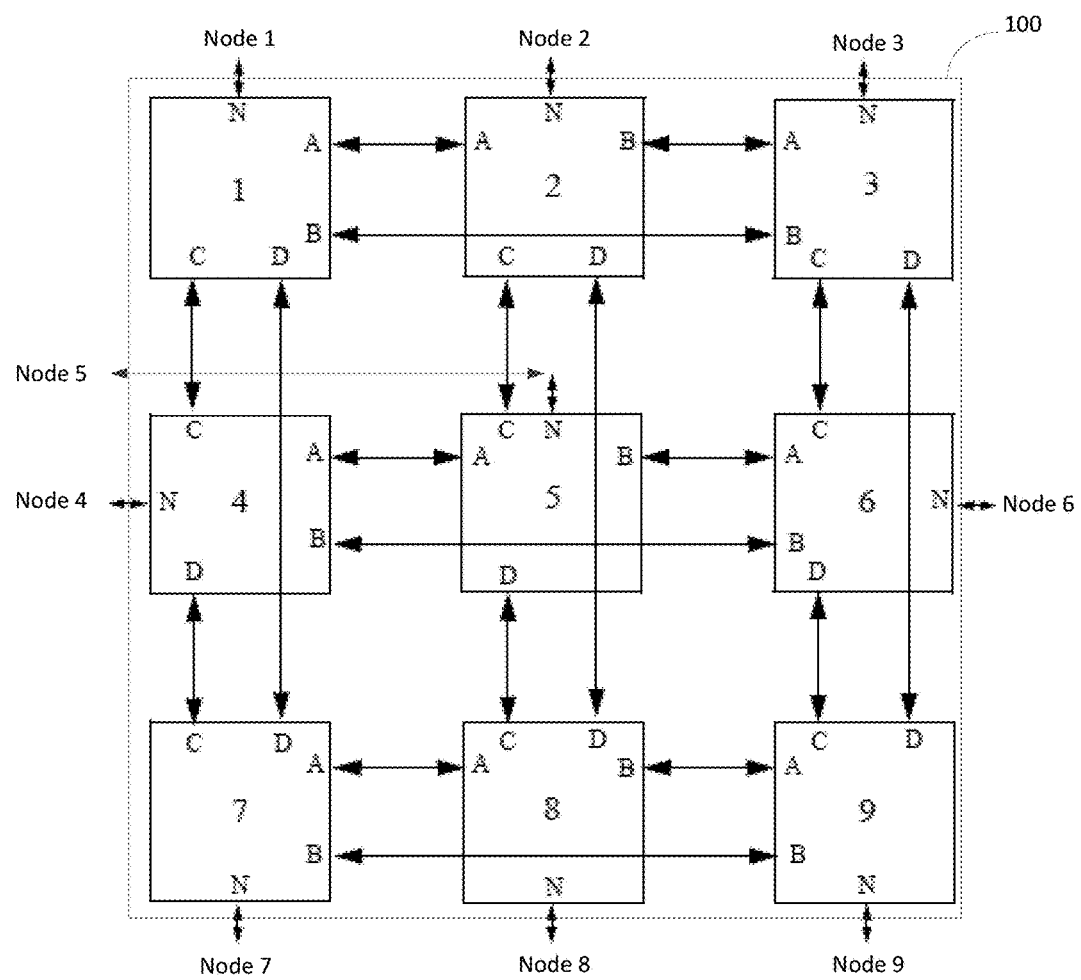
FIG. 2 is a schematic diagram showing an exemplary switching system in the form of a crossbar or matrix switch, in accordance with various exemplary embodiments.

FIG. 2 is a schematic diagram showing switching system 100 in the form of a crossbar or matrix switch, in accordance with various exemplary embodiments. Here, the switching system 100 includes nine switching elements (referred to herein as "tiles") numbered 1 through 9. Each tile has a network port (labeled "N") and four fabric ports (labeled "A" through "D"), where each fabric port is coupled to a corresponding fabric port of another tile to form a mesh configuration. With reference to FIG. 1, in this example, the network port of a given tile n would be coupled to Node n. Thus, in this example, the network port of Tile 1 would be coupled to Node 1, the network port of Tile 2 would be coupled to Node 2, and so on. In certain exemplary embodiments, the entire switching system 100 shown in FIG. 2 preferably would be implemented in hardware, e.g., as an Application Specific Integrated Circuit (ASIC) or using one or more Field Programmable Gate Arrays (FPGAs).

In this example, the tiles are interconnected in a matrix configuration through rows and columns, although other types of interconnections are possible in various alternative embodiments. Specifically, in this example, the matrix configuration includes three rows of tiles (i.e., a first row including Tiles 1-3; a second row including Tiles 4-6; and a third row including Tiles 7-9) and three columns of tiles (i.e., a first column including Tiles 1, 4 and 7; a second column including Tiles 2, 5 and 8; and a third column including Tiles 3, 6 and 9). In this example, each tile is coupled to the other tiles in its row and is coupled to the other tiles in its column. For example, Tile 1 is coupled via port A to Tile 2, via port B to Tile 3, via port C to Tile 4, and via port D to Tile 7. In certain exemplary embodiments, using this matrix configuration, switching or routing a packet of information from one network port to another network port can be performed using no more than two "hops," where a "hop" is a transfer from one tile to another tile. For example, to switch or route a packet of information from Node 9 to Node 1, the switching system 100 may be configured for Tile 9 to transmit the packet via its port B to Tile 7, and Tile 7 may be configured to transmit the packet via its port D to Tile 1. Of course, there are other pathways within the switching system 100 to switch or route a packet from Node 9 to Node 1, so different embodiments may employ different switching/routing logic. An exemplary bandwidth on-demand adaptive routing scheme for a crossbar switching system is described in U.S. Pat. No. 9,237,093 entitled BANDWIDTH ON-DEMAND ADAPTIVE ROUTING, which is hereby incorporated herein by reference in its entirety. It also should be noted that various alternative embodiments may include additional pathways within the switching system 100. For example, additional pathways may be included to form a fully interconnected configuration in which every tile is coupled to every other tile; using such a configuration, switching or routing a packet of information from one network port to another network port can be performed using a single hop. The present invention is not limited to any particular type or configuration of switching system, nor to any particular number of interconnected tiles.

Figure 3:
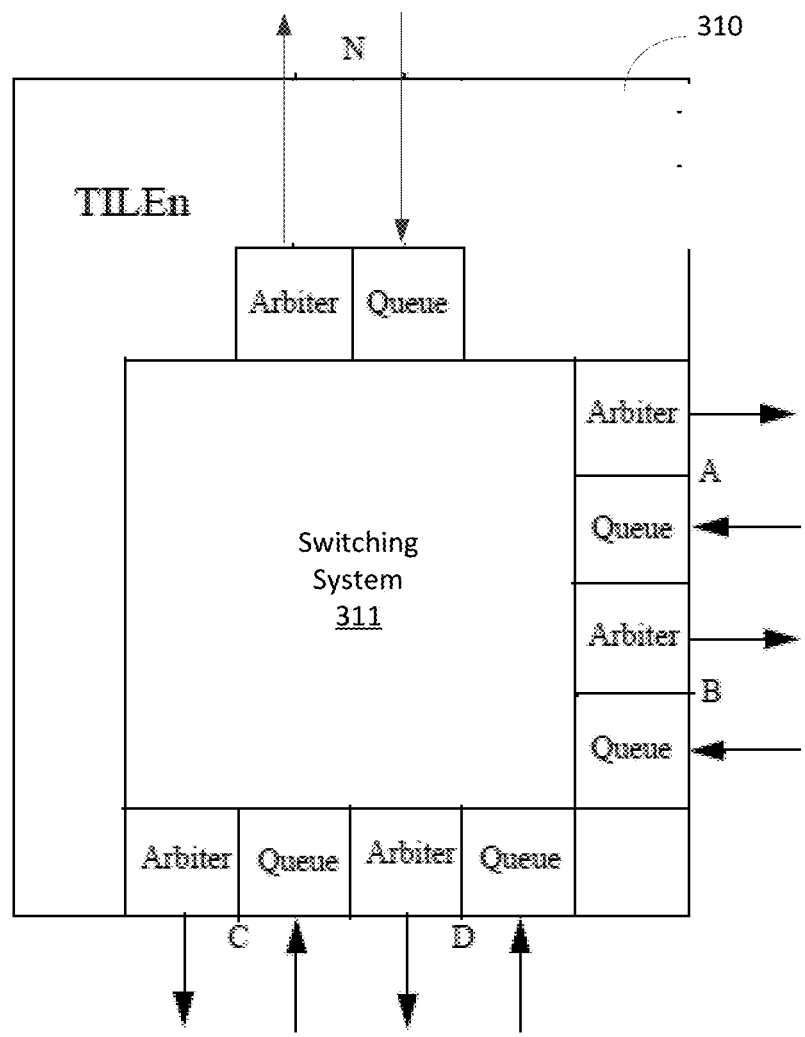
FIG. 3 is a schematic diagram showing elements of a tile of the exemplary switching system of FIG. 2, in accordance with various exemplary embodiments.

FIG. 3 is a schematic diagram showing elements of a tile 310, in accordance with various exemplary embodiments. In this example, each tile 310 includes a network port and a number of fabric ports interconnected via an internal switching system 311. In this example, each port is capable of receiving packets from and transmitting packets to a node external to the tile 310 (in which case the other tiles to which the tile 310 is coupled can be considered nodes with respect to the internal switching system 311). In this example, each port includes a queue circuit (referred to herein as a "queue") for temporarily storing packets received from the external node and an arbitration circuit (referred to herein as an "arbiter") configured to process packets received from the internal switching system 311 to be transmitted to the external node. Typically, the arbiter of a port may receive multiple packets from the internal switching system 311 (e.g., packets from two or more of the other ports), in which case the arbiter determines the order in which the packets are transmitted to the external node using a predetermined arbitration scheme. Some exemplary arbitration circuits and arbitration schemes are discussed below.

Figure 4:
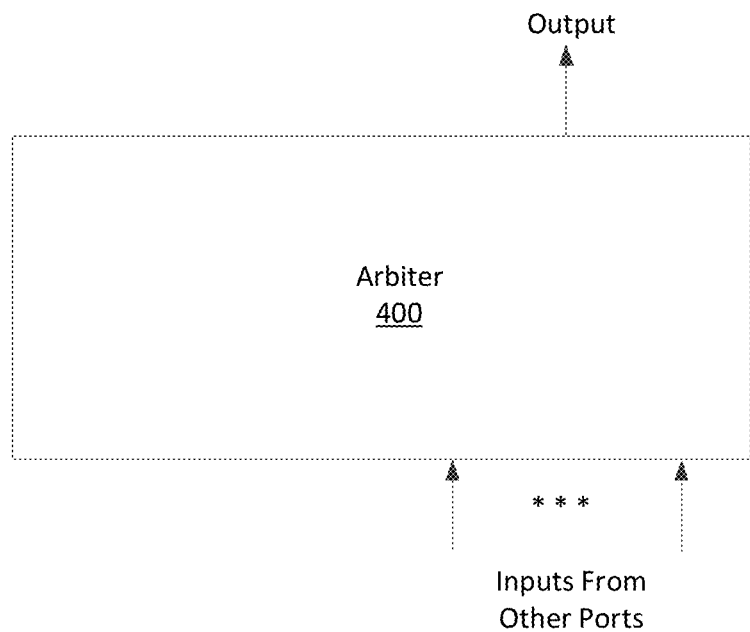
FIG. 4 is a schematic diagram of an arbiter of the exemplary tile of FIG. 3, in accordance with various exemplary embodiments.

FIG. 4 is a schematic diagram of an arbiter 400, in accordance with various exemplary embodiments. From a "black box" perspective, the arbiter 400 receives packets from the internal switching system 311 via various input interfaces and outputs the packets over an output interface. When multiple packets are available to be output, the arbiter 400 determines the order in which the packets are output using a predetermined arbitration scheme.

Figure 5:
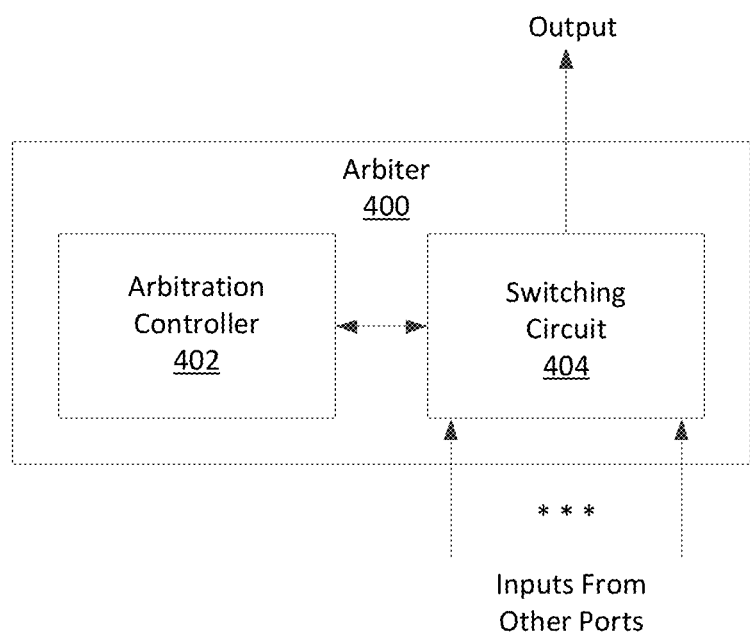
FIG. 5 is a schematic diagram showing elements of the arbiter of FIG. 4, in accordance with various exemplary embodiments.

FIG. 5 is a schematic diagram showing the elements of arbiter 400, in accordance with various exemplary embodiments. Among other things, the arbiter 400 includes an arbitration controller 402 and a switching circuit 404. When multiple packets are available to be output, the arbitration controller 402 determines the order in which the packets are output and controls the switching circuit 404 to output the packets in the determined order. The arbitration controller 402 and the switching circuit 404 can be separate devices or can be a single device that effectively performs both the order determination and the switching. The switching circuit 404 can include a physical switch or a logical switch.

The arbiter 400 can be configured to implement any of a wide variety of arbitration schemes. Two common classes of arbitration schemes include round-robin arbitration and age-based arbitration. In round-robin arbitration, the arbiter 400 typically determines the order for outputting packets on a round-robin basis, e.g., if multiple inputs are competing for bandwidth, then the arbiter 400 may output a number of packets from a first input, then a number of packets from a second input, and so on, stepping through the inputs in a round-robin fashion. In age-based arbitration, the arbiter 400 typically determines the order for outputting packets based on the ages of the packets, e.g., allowing older packets to be output before newer packets. In some embodiments, the arbiter 400 is configured to implement a combination of round-robin and age-based arbitration, although such implementations are often very complex or make significant comprises in order to satisfy timing requirements.

Age-Based Arbitration

In a typical switching system or other shared resource system, age-based arbitration can be implemented by the arbiter 400, specifically by comparing, in real time, the ages of packets available at multiple input interfaces and choosing the packet with the oldest age as the next packet to output. One possible issue with such age-based arbitration is that real-time comparison of packet ages by the arbiter 400 often has an adverse timing and/or latency impact on the switching system. Another possible issue with such age-based arbitration is that one node with predominantly high packet ages can effectively "lock out" nodes with lower packet ages.

Therefore, in certain exemplary embodiments, the age comparison is moved from the arbiter 400 to the queue circuit, which is configured to assign a high priority (HP) flag to a given packet if the packet age exceeds a predetermined threshold. The HP flag is associated with the packet (e.g., included in a flag field in a packet header or conveyed "out-of-band" separately from the packet) and is used by each arbiter that subsequently processes the packet to give priority to the packet over packets without the HP flag. Among other things, this approach removes the real time age comparison from all the arbitration points and simplifies timing and can improve latency.

Figure 6:
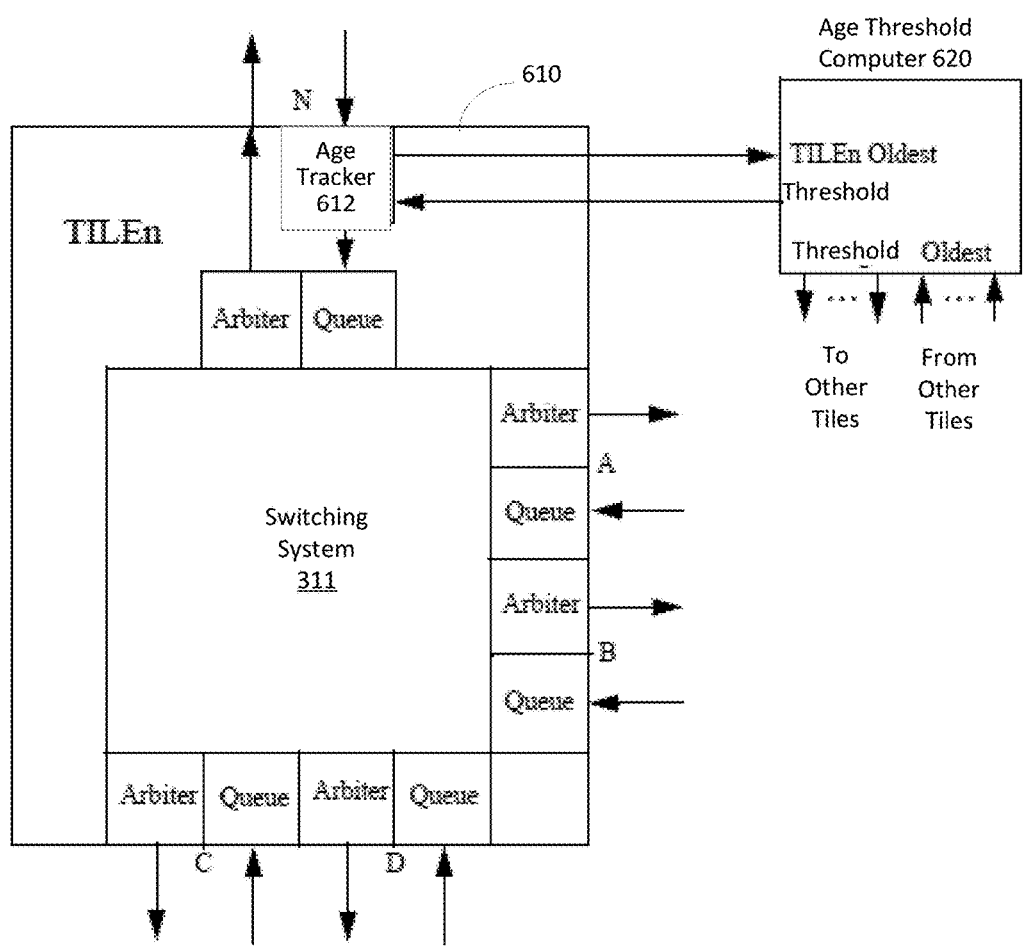
FIG. 6 is a schematic diagram showing an exemplary switching system with an age-based arbitration circuit, in accordance with various exemplary embodiments.

In certain exemplary embodiments, the predetermined threshold is based on the ages of packets entering the switching system on the tile network ports (e.g., the average age). FIG. 6 is a schematic diagram showing a switching system 600 with an age-based arbitration circuit, in accordance with various exemplary embodiments. Among other things, the switching system 600 includes a number of tiles 610 (only one tile 610 is shown for convenience) and an age threshold computer 620. The age threshold computer 620 receives packet age information from the tile network port queue circuits, computes the predetermined threshold, and distributes the predetermined threshold to all of the file network port queue circuits. In this regard, the tile network port queue circuits are configured to include an age tracker circuit 612 that tracks packet age information for incoming network packets, transmits the packet age information to the age threshold computer 620, receives the predetermined threshold from the age threshold computer 620, performs the age comparison on incoming network packets, and assigns an HP flag to network packets having a packet age that exceeds the predetermined threshold. The arbiter 400 is configured to output packets based on the existence or absence of an HP flag in packets competing for bandwidth rather than performing an age comparison in real time, thereby greatly simplifying the arbiter. The age threshold computer 620 may compute and distribute a new threshold from time to time, thereby allowing the switching system 600 to dynamically adjust based on the ages of packets.

In some exemplary embodiments, to insure that a given source with high incoming packet ages does not lock out other sources at the arbitration points, the age tracker circuit 612 is further configured to assign HP status to certain incoming packets regardless of actual packet age (e.g., every Nth packet) in order to ensure that all nodes will occasionally get a chance to flow.

In certain alternative embodiments, the predetermined threshold is a programmable threshold that is distributed to the tile network port queue circuits. In this regard, the age threshold computer 620 can be eliminated from the switching system 600, and the age tracker 612 can be configured to apply the predetermined threshold to incoming network packets without having to track packet age information for incoming network packets and transmit packet age information to an age threshold computer. The programmable threshold may be set once or may be updated from time to time, e.g., based on network congestion information.

Figure 7:
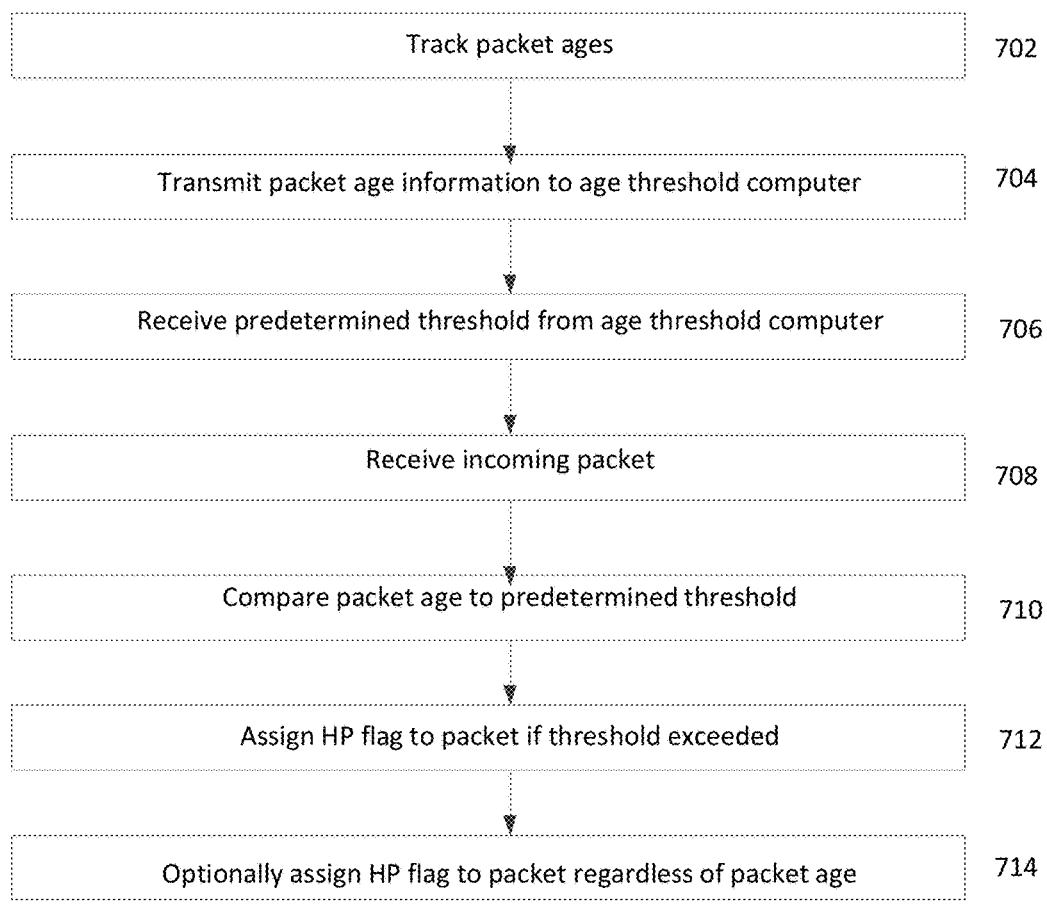
FIG. 7 is a logic flow diagram for the age tracker of an age-based arbitration circuit, in accordance with various exemplary embodiments.

FIG. 7 is a logic flow diagram for the age tracker 612, in accordance with various exemplary embodiments. In block 702, the age tracker 612 tracks packet ages. In block 704, the age tracker 612 transmits packet age information to the age threshold computer 620. In block 706, the age tracker 612 receives the predetermined threshold from the age threshold computer 620. In block 708, the age tracker 612 receives an incoming packet. In block 710, the age tracker 612 compares the packet age to the predetermined threshold. In block 712, the age tracker 612 assigns an HP flag to the packet if the packet age exceeds the threshold. In block 714, the age tracker 612 optionally assigns an HP flag to the packet regardless of packet age.

Predictive Arbitration

In a typical switching system or other shared resource system, even seemingly equal bandwidth distribution among competing sources at a given arbitration point (e.g., using round-robin arbitration) can lead to unequal bandwidth distribution across the switching system.

For example, with reference to FIG. 2, imagine that Tile 2, Tile 8, and Tile 9 are simultaneously transmitting packets to Tile 1, with the packets from Tile 8 and Tile 9 being transferred through Tile 7 to Tile 1. In this case, Tile 9 port B transmits packets to Tile 7 port B and Tile 8 port A transmit packets to Tile 7 port A, and both the Tile 8 and Tile 9 data streams will need to share the Tile 7 port D connection to Tile 1. With round-robin Arbitration at Tile 7 port D, both Tile 8 and Tile 9 theoretically will get 50% of the bandwidth on the Tile 7 port D connection to Tile 1 port D (i.e., the arbiter at Tile 7 port D may alternate between the two requesting sources). Both Tile 8 and Tile 9 data streams arrive at Tile 1 on the same connection, i.e., Tile 1 port D. The Tile 2 data stream arrives at Tile 1 on port A. The round-robin arbiter on the Tile 1 network port will see two competing sources (i.e., port A and port D) and will divide the bandwidth evenly between those two sources. Thus, port A will get 50% of the Tile 1 network port bandwidth and port D will get 50% of the Tile 1 network port bandwidth. However, since Tile 1 port D is carrying two data streams (i.e., one from from Tile 8 and one from Tile 9), the overall bandwidth for the Tile 8 and Tile 9 data streams effectively is reduced to one half of 50% or 25% each.

Therefore, in various exemplary embodiments, the arbiter at each fabric port is configured to provide a count of the number of active sources competing for bandwidth. For example, using the above scenario, the arbiter at Tile 8 port A would provide a count of 1 to Tile 7 to indicate that the packets received from Tile 8 port A are associated with a single source, and the arbiter at Tile 9 port B would provide a count of 1 to Tile 7 to indicate that the packets received from Tile 9 port B are associated with a single source. Therefore, Tile 7 port D would provide divide the bandwidth of Tile 7 port B equally between Tile 8 and Tile 9 and would provide a count of 2 to Tile 1 to indicate that two sources (i.e., Tile 8 and Tile 9) are competing for bandwidth. Furthermore, the arbiter at Tile 2 port A would provide a count of 1 to Tile 1 to indicate that the packets received from Tile 2 port A are associated with a single source. Then, the arbiter on the Tile 1 network port can determine the total number of sources competing for bandwidth (in this example, the total number of sources would be three) and can allocate the Tile 1 network port bandwidth based on the total number of sources. In this above example, there are three sources competing for Tile 1 network port bandwidth (two via Tile 1 port D and one via Tile 1 port A), so the arbiter on the Tile 1 network port generally would be configured to allocate ⅔ of the bandwidth to Tile 1 port D and ⅓ of the bandwidth to Tile 1 port A, for example, by outputting two packets from port D for every one packet output from port A. In this way, Tile 2, Tile 8, and Tile 9 each receives ⅓ of the Tile 1 network port bandwidth. Thus, by providing a count of the number of active sources associated with a data stream, the arbiter at the receiving tile can distribute bandwidth more fairly among the competing sources.

It should be noted that in certain exemplary embodiments, one or more of the intermediate data streams (i.e., the data streams from Tile 2, Tile 8, and/or Tile 9 in the above example) may include packets from multiple sources. For example, assume that the data stream from Tile 9 to Tile 1 aggregates packets from Tile 6 and Node 9. Here, Tile 9 would split the bandwidth on the connection to Tile 7 equally between its two sources and would provide a count of 2 to Tile 7. Tile 7 would then divide the bandwidth on the connection to Tile 1 between three sources (e.g., ⅔ to Tile 9 and ⅓ to Tile 8) and would provide a count of 3 to Tile 1. Tile 1 would then divide the Tile 1 network port bandwidth between four sources (e.g., ¾ to Tile 1 port D and ¼ to Tile 1 port A).

In certain exemplary embodiments, if the network port has packets for the outgoing connection to the destination (i.e., over one of the fabric ports), the network port is considered to be associated with a single source for purposes of predictive arbitration as discussed herein, because the external node from which packets are received at the network port generally will not provide a count of the number of sources associated with the data stream.

Figure 8:
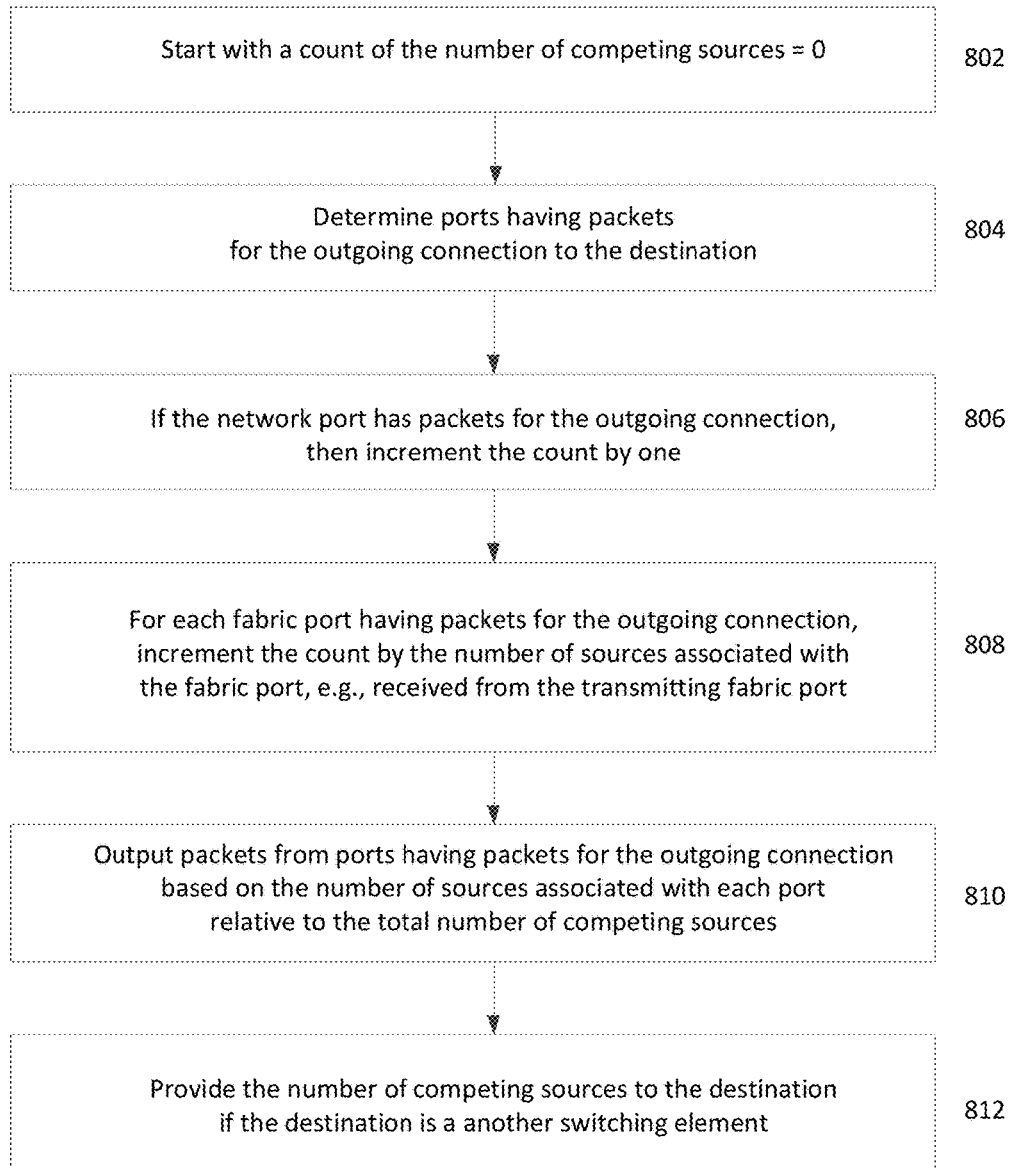
FIG. 8 is a logic flow diagram for predictive arbitration by the arbiter of a port, in accordance with various exemplary embodiments, in accordance with various exemplary embodiments.

FIG. 8 is a logic flow diagram for predictive arbitration by the arbiter of a port, in accordance with various exemplary embodiments, in accordance with various exemplary embodiments. In block 802, the arbiter starts with a count of the number of competing sources equal to zero. In block 804, the arbiter determines which port(s) have packets for the outgoing connection to the destination. In block 806, if the network port has packets for the outgoing connection, then the arbiter increments the count by one, since, in this particular exemplary embodiment, the network port is considered to be associated with a single source for purposes of predictive arbitration. In block 808, for each fabric port having packets for the outgoing connection, the arbiter increments the count by the number of sources associated with the port, which, in this particular exemplary embodiment, may be received from the transmitting fabric port. In block 810, the arbiter outputs packets from ports having packets for the outgoing connection based on the number of sources associated with each port relative to the total number of competing sources (e.g., as indicated by the count of the number of competing sources). In block 812, the arbiter preferably provides the number of competing sources to the destination if destination is another switching element (tile).

In order to support predictive arbitration as discussed herein, the queue circuit of each fabric port typically includes special circuitry to receive a count of the number of competing sources from the transmitting fabric port and to provide the count for use by the arbiter associated with the outgoing connection.

Figure 9:
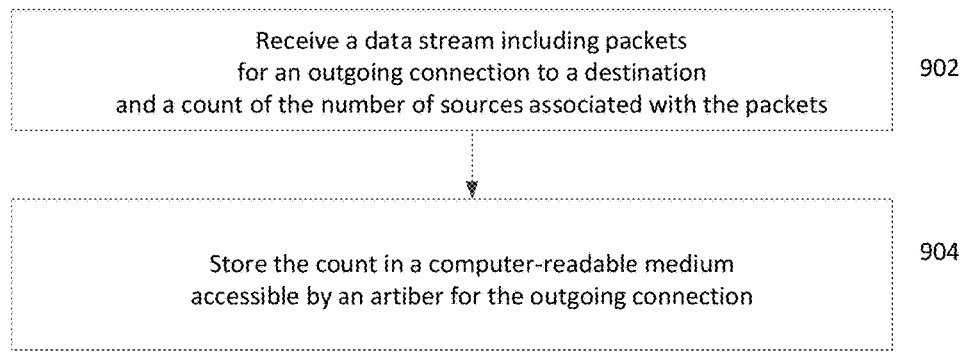
FIG. 9 is a logic flow diagram for predictive arbitration by the queue circuit of a port, in accordance with various exemplary embodiments.

FIG. 9 is a logic flow diagram for predictive arbitration by the queue circuit of a port, in accordance with various exemplary embodiments. In block 902, the queue circuit receives a data stream including packets for the outgoing connection to the destination along with a count of the number of sources associated with the packets. In block 904, the queue circuit provides the count for use by the arbiter associated with the outgoing connection, e.g., by storing the count in a computer-readable medium accessible by the arbiter for the outgoing connection.

Shared-Credit Arbitration

In a typical switching system or other shared resource system, shared resources at a destination (e.g., bandwidth on a destination communication channel or buffers in a destination memory) can be accessed by multiple entities (referred to herein for convenience as "virtual channels" or "VCs"). Virtual channels can be separate physical channels to the destination (e.g., different source ports accessing a particular destination arbiter in a switching system such as of the type discussed with reference to FIG. 3) or multiple logical channels to the destination over a single physical channel (e.g., different virtual channels for different packet types or data streams). Thus, for example, multiple sources can access shared resources at the destination over separate physical/virtual channels, or a single source can access shared resources at the destination using multiple virtual channels over a single physical channel.

Figure 16:
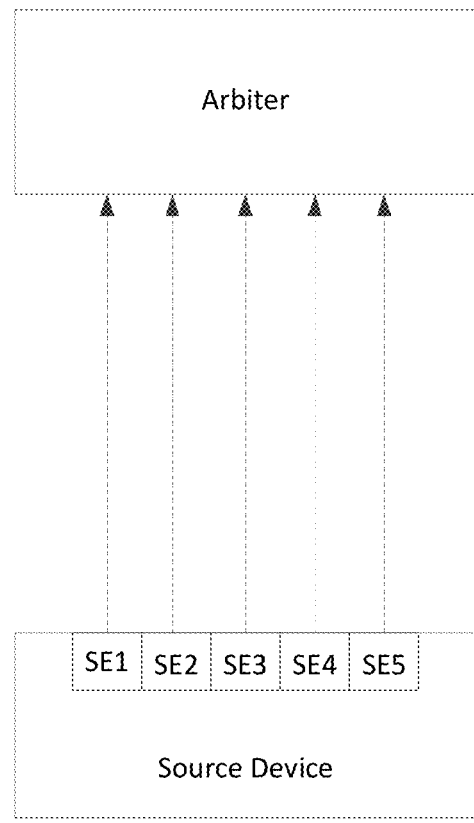
FIG. 16 is a schematic diagram showing multiple virtual channels between a source device and a destination device (arbiter) for a shared-credit arbitration circuit, in accordance with various exemplary embodiments.

FIG. 16 is a schematic diagram showing multiple virtual channels between a source device and a destination device (arbiter) over a single physical channel, in accordance with various exemplary embodiments. In this example, there are five virtual channels between the source device and the arbiter. The virtual channels can be used for virtually any type of access, such as, for example, separate virtual channels for different applications, sockets, communication protocols, or packet types (e.g., requests vs. responses), to name but a few.

Figure 11:
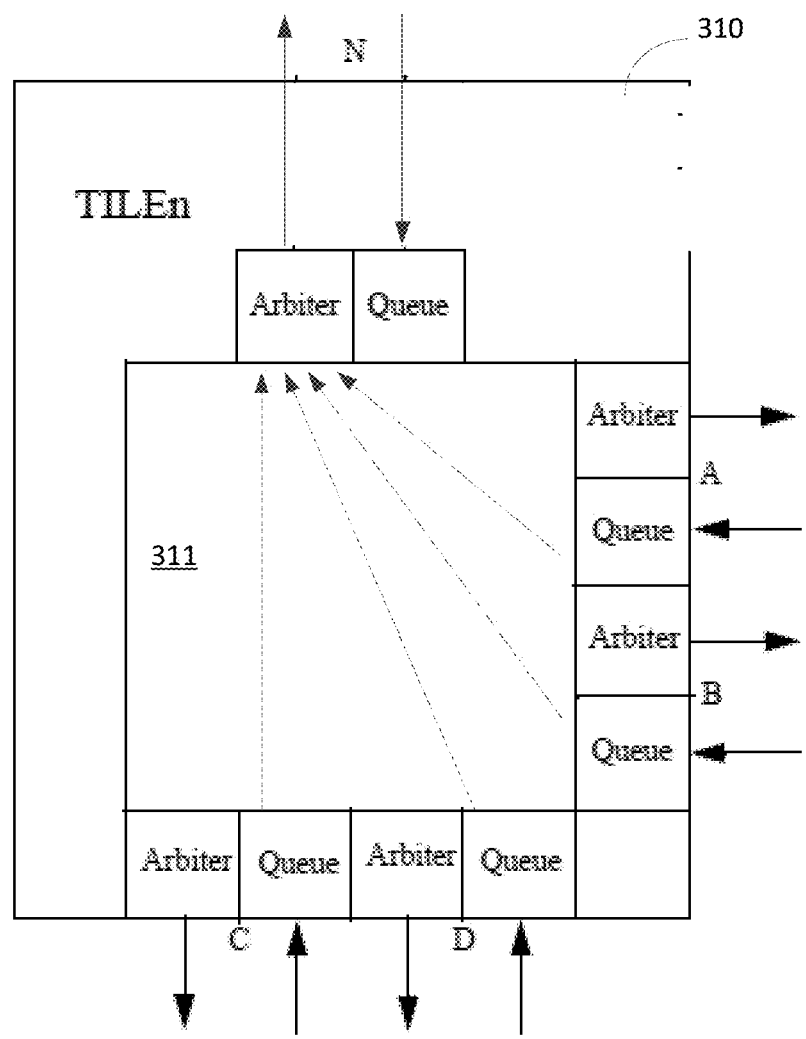
FIG. 11 is a schematic diagram showing some possible arrangements of virtual channels for a shared-credit arbitration circuit in the context of a tile of a switching system such as of the type shown in FIG. 3, in accordance with various exemplary embodiments.

FIG. 11 is a schematic diagram showing some possible arrangements of virtual channels in the context of a tile of a switching system such as of the type shown in FIG. 3, in accordance with various exemplary embodiments. In this example, each port A-D has a separate physical channel to the arbiter of port N. From an arbitration perspective, the separate physical channels from ports A-D to the arbiter of port N may be considered separate virtual channels, with the queue circuits of ports A-D representing separate sources for such virtual channels. Thus, the arbiter of port N can arbitrate accesses by ports A-D to port N (e.g., using round-robin arbitration to cycle through ports A-D). Furthermore, in certain exemplary embodiments, each of the separate physical channels from ports A-D to the arbiter of port N can include multiple logical channels. From an arbitration perspective, the logical channels associated with each physical channel may be considered virtual channels, with the queue circuit of each port representing a common source for the virtual channels associated with that port. Thus, the arbiter of port N can arbitrate accesses by the logical channels of ports A-D to port N (e.g., using a form of "round robin" arbitration to cycle through ports A-D on a round-robin basis and, for each port, providing accesses to the logical channels on a round-robin basis). It also would be possible for a similar arrangement to exist for each of the other arbiters.

Accesses can be divided among the virtual channels in a variety of ways. For example, each virtual channel may be allotted a dedicated amount of resources from a pool of resources and/or multiple virtual channels may share a pool of resources. One way to divide access among the multiple virtual channels is to use a credit-based system in which each virtual channel is allotted a certain amount of credits and the source associated with a particular virtual channel (which manages the credits for the virtual channel) can access the shared resource only when the virtual channel has credits available. Each time a source associated with a particular virtual channel accesses the shared resource, it uses one of the virtual channel's credits, and when the destination frees the resource, the credit is returned by the destination to the source. When the virtual channel has no available credits, the source generally has to wait for resources to be freed and credits returned by the destination.

Some credit-based arbitration schemes include two types of resource pools, namely a dedicated pool for each virtual channel and a shared pool, and further include two types of credits, namely dedicated credits and shared credits that are allotted to the virtual channel s. Credit schemes utilizing dedicated and shared credits often rely on the source(s) being fully aware of the various credit streams available at the destination shared resource. For example, in such credit schemes, the source associated with each virtual channel generally maintains a count of the number of dedicated credits and a count of the number of shared credits available to the virtual channel, and then the source chooses which type of credit to use for a given destination access. This approach can significantly complicate the overall implementation of the source(s).

Various exemplary embodiments employ a credit-based arbitration scheme in which only the destination is aware of the availability of shared credits, which significantly reduces the complexity and required handshaking between the source(s) and the destination. Specifically, the destination maintains a dedicated amount of resources for each virtual channel and also maintains a pool of resources that are shared by and among the various virtual channels. The source associated with each virtual channel is provided with a number of credits for the virtual channel, which generally (but not necessarily) represents the number or amount of dedicated resources allotted for the virtual channel by the destination. When a particular source wants to access the shared resource over a particular virtual channel (e.g., to transmit a packet of information to the destination), the source can do so only if there is at least one credit available for that virtual channel, and the source decrements the number of available credits has associated with the virtual channel for each packet it sends to the destination over the virtual channel. Each packet typically includes a virtual channel identifier for use by the destination, e.g., for identifying the dedicated resources associated with the virtual channel. The destination can choose, independently of the source, to allocate a shared resource or a dedicated resource for the packet. If the destination allocates a shared resource for the packet, then the destination returns a credit back to the source for that virtual channel, in effect hiding the fact that the packet was used for a shared resource (if the destination had allocated a dedicated resource for the packet, the destination generally would not return the credit to the source until that dedicated resource has been freed). Such a shared-credit arbitration scheme can be used in any of a wide variety of contexts, such as, for example, controlling access to an output port of a switch, e.g., controlled by an arbiter at the destination, or controlling access to a computer memory, e.g., in a Dynamically Allocated Memory Queue (DAMQ) buffer.

Figure 10:
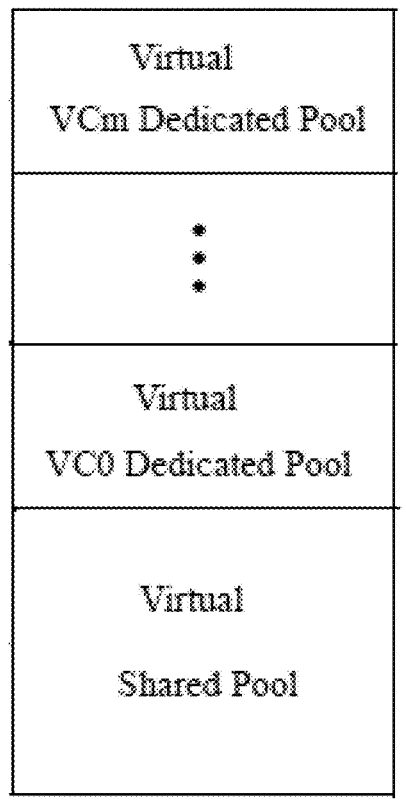
FIG. 10 is a schematic diagram showing a shared resource pool maintained by a destination, in accordance with various exemplary embodiments.

FIG. 10 is a schematic diagram showing a shared resource pool maintained by the destination, in accordance with various exemplary embodiments. Here, the shared resource pool is divided (either physically or logically) into a dedicated pool for each VC numbered 0-m and also including a shared pool of resources. The shared resource pool may include virtually any type of shared resource, such as, for example, buffers, slots in an output queue, or bandwidth on a communication connection, to name but a few.

Figure 12:
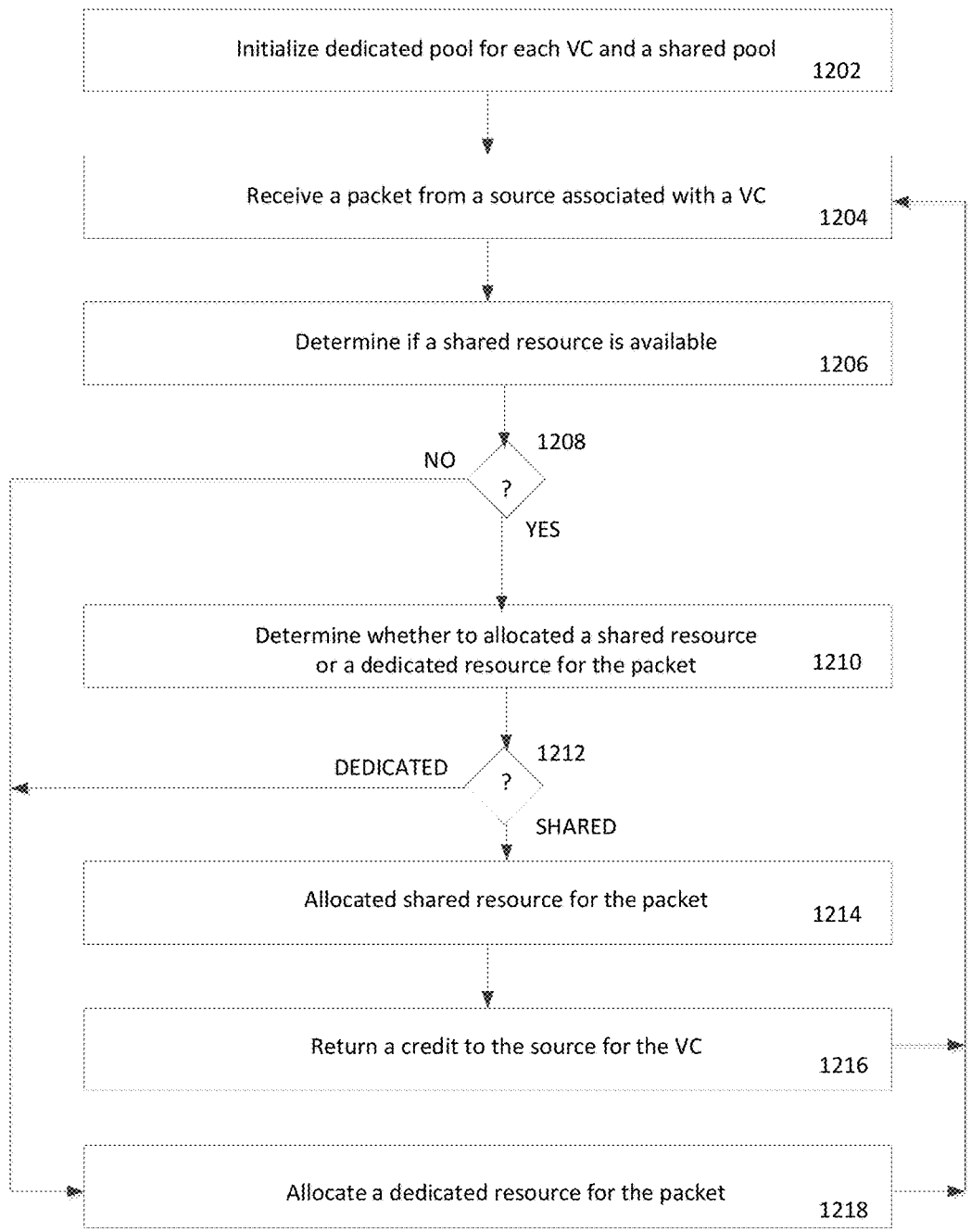
FIG. 12 is a flow chart for processing packets by a destination arbiter in a shared-credit arbitration circuit, in accordance with various exemplary embodiments.

FIG. 12 is a flow chart 1200 for processing packets by the destination arbiter, in accordance with various exemplary embodiments. In block 1202, the destination arbiter initializes a dedicated pool for each virtual channel and also initializes a shared pool. In block 1204, the destination arbiter receives a packet from a source associated with a virtual channel. In block 1206, the destination arbiter determines if a shared resource is available in the shared pool. If no shared resource is available in the shared pool (NO in block 1208), then the destination arbiter allocates a dedicated resource for the packet in block 1218 and recycles to block 1204 to receive another packet. If, however, a shared resource is available in the shared pool (YES in block 1208), then the destination arbiter optionally determines whether to allocate a shared resource or a dedicated resource for the packet, in block 1210. The destination arbiter may make such a determination, for example, based on the number of shared resources available, the number or amount of shared resources already being used for that virtual channel, or other considerations. If the destination arbiter determines that a dedicated resource should be allocated in block 1212, then the destination arbiter allocates a dedicated resource for the packet in block 1218 and recycles to block 1204 to receive another packet. If, however, the destination arbiter determines that a shared resource should be allocated in block 1212, then the destination arbiter allocates a shared resource for the packet, in block 1214, returns a credit to the source for that virtual channel, in block 1216, and recycles to block 1204 to receive another packet.

Figure 13:
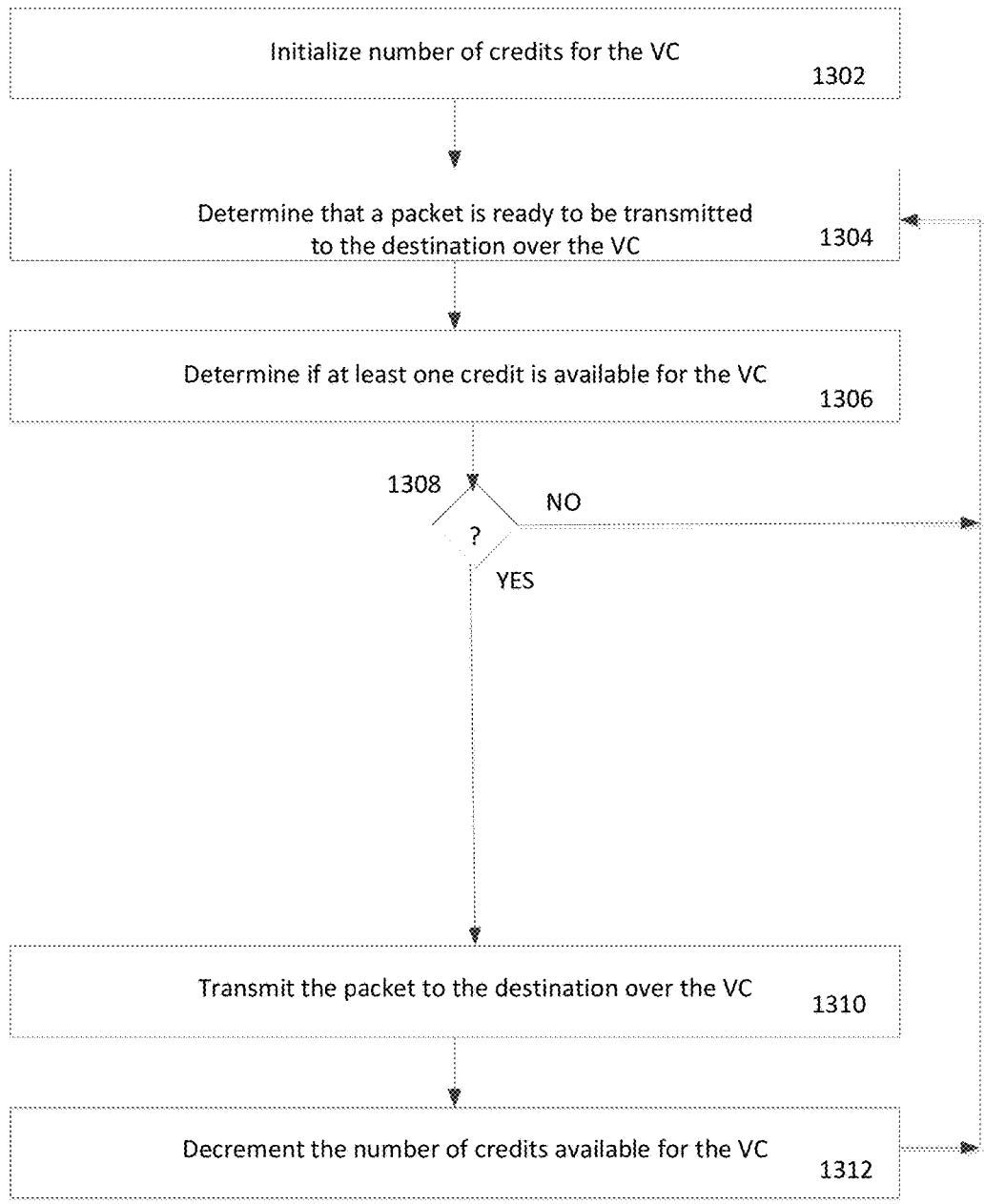
FIG. 13 is a flow chart for processing packets by a source associated with a virtual channel in a shared-credit arbitration circuit, in accordance with various exemplary embodiments.

FIG. 13 is a flow chart 1300 for processing packets by a source associated with a virtual channel, in accordance with various exemplary embodiments. In block 1302, the source initializes the number of credits for the virtual channel, which may be fixed or variable and may be pre-programmed or provided by the destination arbiter. In block 1304, the source determines that a packet is ready to be transmitted to the destination over the virtual channel. In block 1306, the source determines if at least one credit is available for the virtual channel to the destination. Note that the source does not need to differentiate between dedicated credits and shared credits; instead, the source only needs to know if it has a credit available. If the source determines that there are no credits available for the virtual channel (NO in block 1308), then the source recycles to block 1304. If, however, the source determines that there is at least one credit available for the virtual channel (YES in block 1308), then the source transmits the packet to the destination over the virtual channel, in block 1310, decrements the number of credits available for the virtual channel, in block 1312, and recycles to block 1304.

FIG. 14 is a flow chart 1400 for returning a credit to the source upon freeing a dedicated resource by the destination arbiter, in accordance with various exemplary embodiments. In block 1402, the destination arbiter frees a dedicated resource associated with a virtual channel, such as, for example, by outputting the packet or freeing a buffer. In block 1404, the destination arbiter returns a credit to the source for the virtual channel.

FIG. 15 is a flow chart 1500 for processing a returned credit by the source, in accordance with various exemplary embodiments. In block 1502, the source receives a returned credit for the virtual channel from the destination arbiter. In block 1504, the source increments the number of credits associated with the virtual channel.

In one specific exemplary embodiment, credit-based arbitration of the type described above is used in the context of shared memory such as a Dynamically Allocated Memory Queue (DAMQ) buffer. Generally speaking, a DAMQ buffer is a buffer scheme that utilizes a linked list of buffers for each virtual channel so that the overall memory resource can be allocated between virtual channels on the fly. A dedicated buffer pool may be allocated for each virtual channel, and a shared buffer pool may be allocated to be shared among the virtual channels. The dedicated buffer pools generally ensure forward progress for each virtual channel, and the shared buffer pool generally allows optimization of overall buffer resources based on active virtual channels. In this regard, the shared credit pool can be thought of as a dynamically adaptable extension to the normal DAMQ functionality, where the linked lists associated with each destination port on the DAMQ all support the combined total of both the dedicated and shared credit pools. In effect, the DAMQ will appear to be much larger than it really is (based on the dedicated credit pool alone) and will dynamically adapt the available shared queue space across all virtual channels based on the flow of data from the source(s). The shared buffer pool also may provide lower latency, as a buffer entry does not need to be freed before a credit can be returned to source. As discussed above, in the described credit-based arbitration scheme, the source is not aware of the presence of the shared buffer pool, which significantly reduces the overall complexity of source(s) for credit management.

Figure 17:
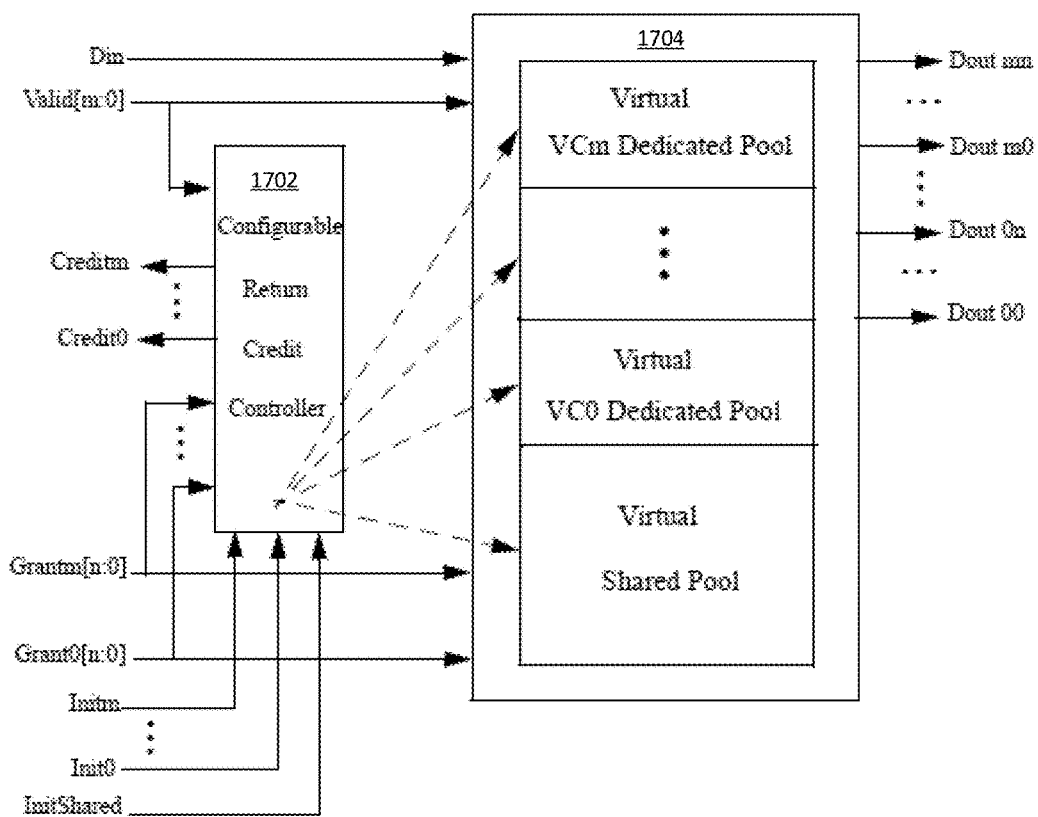
FIG. 17 is a schematic diagram showing a DAMQ buffer system with credit-based arbitration, in accordance with various exemplary embodiments.

FIG. 17 is a schematic diagram showing a DAMQ buffer system 1700 with credit-based arbitration, in accordance with various exemplary embodiments. Among other things, the DAMQ buffer system 1700 includes a credit-based arbiter 1702 and a shared DAMQ 1704. Generally speaking, the credit-based arbiter 1702 is a circuit that implements the destination-side arbitration, for example, as discussed above with reference to FIGS. 12 and 14. Specifically, when the credit-based arbiter 1702 receives a packet from a particular source associated with a particular virtual channel, the credit-based arbiter 1702 decides whether to store the packet in a dedicated buffer associated with that virtual channel or alternatively in a shared buffer. If the credit-based arbiter 1702 stores the packet in a shared buffer, then the credit-based arbiter 1702 returns a credit to the source for the virtual channel (in this example, via the Credit signal line corresponding to the virtual channel (i.e., Credit0-Creditm correspond to VC0-VCm).

Figure 18:
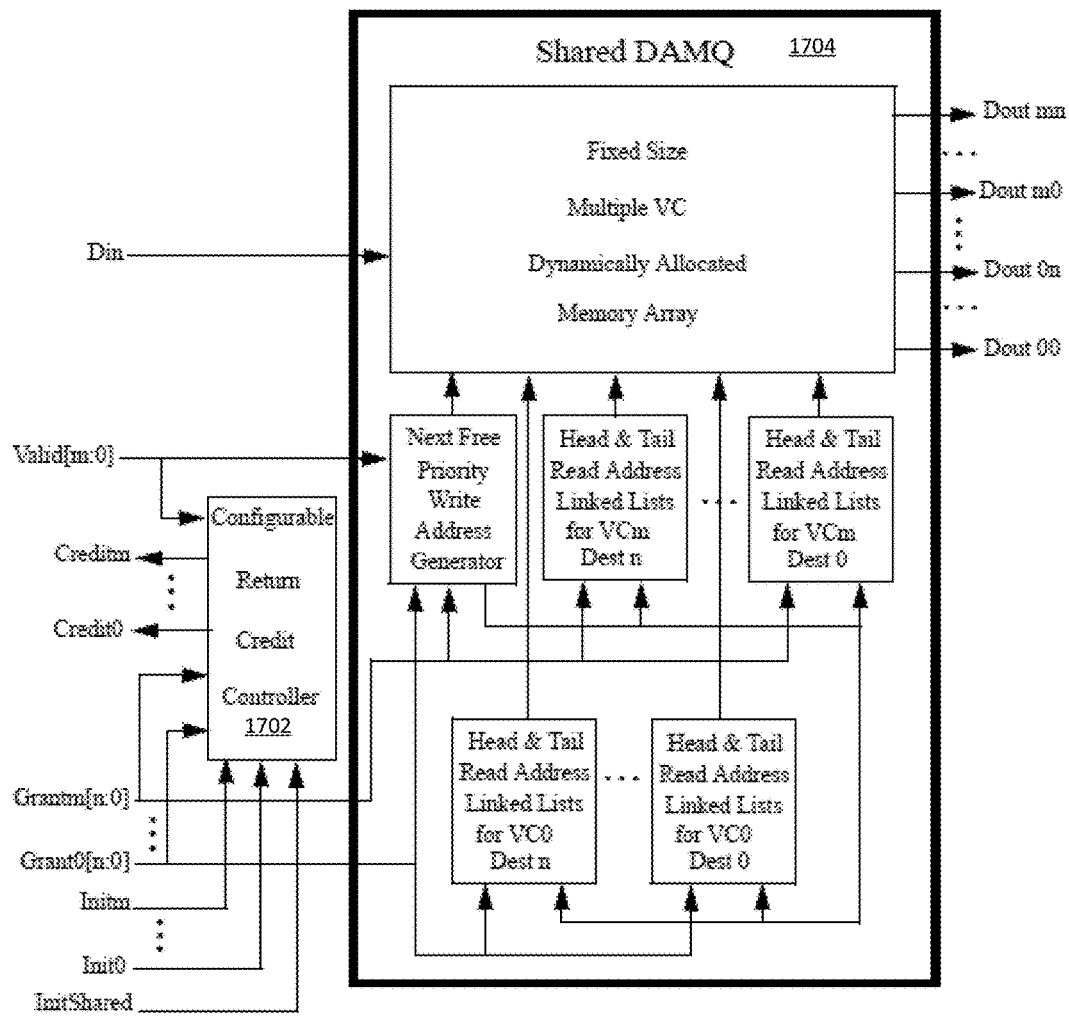
FIG. 18 is a schematic diagram showing logic blocks associated with management of buffer pools in the shared DAMQ of FIG. 17, in accordance with various exemplary embodiments.

FIG. 18 is a schematic diagram showing logic blocks associated with management of the buffer pools in the shared DAMQ 1704, in accordance with various exemplary embodiments. In this example, each virtual channel (i.e., VC0-VCm) can be associated with multiple destinations (i.e., Dest 0-Dest n). A linked list is maintained for each virtual channel/destination. Each linked list includes a head register for storing a head read address and a tail register for storing a tail read address. The head register points to the first buffer in the queue and the tail register points to the last buffer in the queue. A next free priority write address generator generates the address for the buffers to be used for storing packets for the virtual channel/destination. The virtual channel/destination is selected via the Grant signal lines (i.e., Grant0[n:0]-Grantm[n:0]).

Scripted Arbitration

In various exemplary embodiments, the arbiter is specially configured to run scripts to allow for fully programmable control of the arbitration process including, for example, which port(s) or source(s) to prioritize in a given arbitration cycle, and, when the arbiter supports multiple arbitration schemes (e.g., round-robin arbitration and age-based arbitration), which arbitration scheme to prioritize in a given arbitration cycle.

Thus, for example, in certain exemplary embodiments, the scripted arbiter can be controlled via a script to support round-robin arbitration for zero or more arbitration cycles followed by age-based arbitration for a zero or more arbitration cycles, thereby allowing the arbiter to range from fully round-robin at one extreme to fully age-based at the other extreme or to any degree of tuning between these two extremes. Furthermore, the scripted arbiter can be configured to allow for the implementation and selection of any number of arbitration schemes, such as, for example, different types of round-robin arbitration schemes and/or different types of age-based arbitration schemes and/or other types of in arbitration schemes. The scripted arbiter can be configured to support source masking and explicit priority control during arbitration cycles, as discussed herein. Operation of the scripted arbiter can be dynamically controlled by changing the script, as opposed to reconfiguring the arbiter itself.

Figures 19, 20:
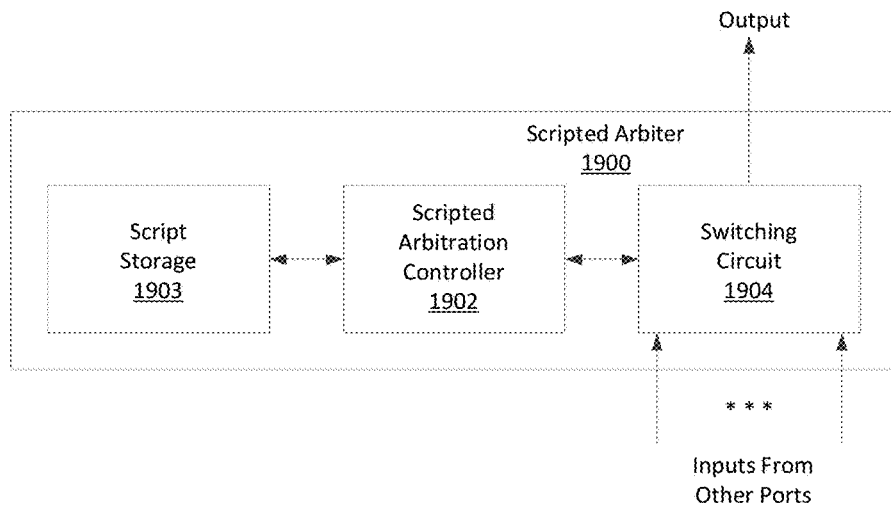
FIG. 19 is a schematic diagram showing the elements of a scripted arbiter, in accordance with various exemplary embodiments.
FIG. 20 is a schematic diagram showing a sample script for use by a scripted arbiter, in accordance with one specific exemplary embodiment.

FIG. 19 is a schematic diagram showing the elements of a scripted arbiter 1900, in accordance with various exemplary embodiments. Among other things, the scripted arbiter 1900 includes a scripted arbitration controller 1902, a script storage 1903, and a switching circuit 1904. When multiple packets are available to be output, the scripted arbitration controller 1902 determines the order in which the packets are output and controls the switching circuit 1904 to output the packets in the determined order based on a script that is stored in the script storage 1903. The arbitration controller 1902 and the switching circuit 1904 can be separate devices or can be a single device that effectively performs both the order determination and the switching. The switching circuit 1904 can include a physical switch or a logical switch. The script storage 1903 is shown as being an element of the scripted arbiter 1900, although in certain alternative embodiments, the script storage 1903 may be external to the scripted arbiter 1900 (e.g., in an external memory) that is accessed by the scripted arbitration controller 1902.

FIG. 20 is a schematic diagram showing a sample script, in accordance with one specific exemplary embodiment. In this example, each line of the script (which is referenced by an index) includes a source mask field, a priority field, a count field, and a done field. Thus, for example, the script may be stored as an array of values, where each row in the array represents a single line of the script and includes a source mask value, a priority value, a count value, and a done value for that line of the script. The index number is generally not part of the script itself, although it may be in certain embodiments. Similarly, the description information is generally not part of the script itself (although it may be included in the script as non-executable remarks); the description is included in this example to assist with understanding of the script.

In this exemplary embodiment, the source mask value indicates which of five virtual channels (referred to in this example as "sources" numbered from 0 to 4) are to be provided access during the execution of that line of the script. The priority value indicates which port(s) or source(s) are to be given priority during round-robin arbitration cycles (a zero priority value indicates age-based arbitration in this exemplary embodiment). The count value indicates the number of iterations the specified arbitration scheme is to be run during the execution of that line of the script (e.g., the count value may indicate the maximum number of packets that can be provided access during execution of that line of the script). The done value indicates whether or not the line of the script represents the end of the script (a value of one indicates the end of the script in this exemplary embodiment). After executing the last line of the script, the scripted arbiter is typically configured to recycle back to the first line of the script.

The first line of this script (index 0) would cause the scripted arbiter to perform round-robin arbitration across all five sources for one cycle, with source number 0 given priority. Thus, for example, if source 0 had a packet to send, then source 0 would be given access; otherwise the arbiter would provide access to one of the other ports in a round-robin fashion.

The second line of this script (index 1) would cause the scripted arbiter to perform round-robin arbitration across all five sources for one cycle, with source number 1 given priority. Thus, for example, if source 1 had a packet to send, then source 1 would be given access; otherwise the arbiter would provide access to one of the other ports in a round-robin fashion.

The third line of this script (index 2) would cause the scripted arbiter to perform round-robin arbitration across all five sources for one cycle, with source number 2 given priority. Thus, for example, if source 2 had a packet to send, then source 2 would be given access; otherwise the arbiter would provide access to one of the other ports in a round-robin fashion.

The fourth line of this script (index 3) would cause the scripted arbiter to perform round-robin arbitration across all five sources for one cycle, with source number 3 given priority. Thus, for example, if source 3 had a packet to send, then source 3 would be given access; otherwise the arbiter would provide access to one of the other ports in a round-robin fashion.

The fifth line of this script (index 4) would cause the scripted arbiter to perform round-robin arbitration across all five sources for two iterations, with source number 4 given priority in both iterations. Thus, for example, in each iteration, if source 4 had a packet to send, then source 4 would be given access; otherwise the arbiter would provide access to one of the other ports in a round-robin fashion. In various alternative embodiments, instead of starting each iteration giving priority to source 4, the scripted arbiter may be configured to continue round-robin arbitration based on where the prior iteration ended.

The sixth line of this script (index 5) would cause the scripted arbiter to perform age-based arbitration across sources 1-4 for four cycles. Thus, for example, in each of the four cycles, the arbiter would provide access to source 1, source 2, source 3, or source 4 based on an age-based determination (e.g., providing access to the source having the oldest packet). The scripted arbiter may be configured to provide access to one source per cycle.

The seventh line of this script (index 6) would cause the scripted arbiter to perform age-based arbitration on source 0 for one cycle. In essence, this would give source 0 access provided it had any packet to send.

Since the seventh line of this script is the end of the script (i.e., the value of the done field is one), the arbiter generally would recycle back to the first line of the script and continue executing the script from there.

In certain exemplary embodiments, the scripted arbiter may be configured to process consecutive round-robin lines in a script on a collective basis rather than on a strict one-by-one basis. For example, the scripted arbiter may be configured to skip lines in the script that give priority to sources that were given an opportunity for access during a prior round-robin cycle. By way of example, assume that the scripted arbiter ends up providing access to source 3 when processing the first line (index 0) of the sample script (which gives priority to source number 0). In this case, the scripted arbiter may be configured to take no action when processing lines 2-4 (indexes 1-3) and instead continue processing from line 5 (index 4), which in this example would give source 4 priority for the next access. In this way, all five sources would have been given an opportunity for access. If, instead, the scripted arbiter had processed each line of the script on a strict one-by-one basis and if source 3 happened to have multiple packets queued for access, then source 3 might have been given up to four consecutive accesses (e.g., at line 1 prioritizing source 0, at line 2 prioritizing source 1, at line 3 prioritizing source 2, and at line 4 prioritizing source 3) before source 4 was given an opportunity for access. In certain exemplary embodiments, a separate counter is used to count and run the number of consecutive round-robin cycles to be performed (collectively across all of the round-robin script states) before moving on to the aging arbitration phases of the script. Thus, for example, with reference again to the sample script shown in FIG. 20, the separate counter may be used to run five round-robin cycles before moving on to the sixth and seventh lines, even when some lines in the round-robin phase are skipped as discussed herein.

In certain exemplary embodiments, the winner for each of the supported arbitration schemes can be calculated in parallel, and then based on the script state, the scripted arbiter can select the winner to be provided access in a given grant cycle. Among other things, this can provide a significant benefit to both timing and arbitration protocol support without making unnecessary trade-offs in supported features of the types often encountered when select features of multiple arbitration protocols are combined into one composite arbiter.

In order to insure optimum latency and the highest throughput in avoiding "bubbles," a default arbitration scheme can also be added in parallel with the other algorithms. This default arbitration scheme is utilized to insure that if the primary algorithm does not produce a "winner" (possibly due to source masking) that if any other source(s) can flow, one will. The default arbitration scheme also may incorporate a pseudo-random feature (or other methodology) to resolve ties if necessary.

Figure 21:
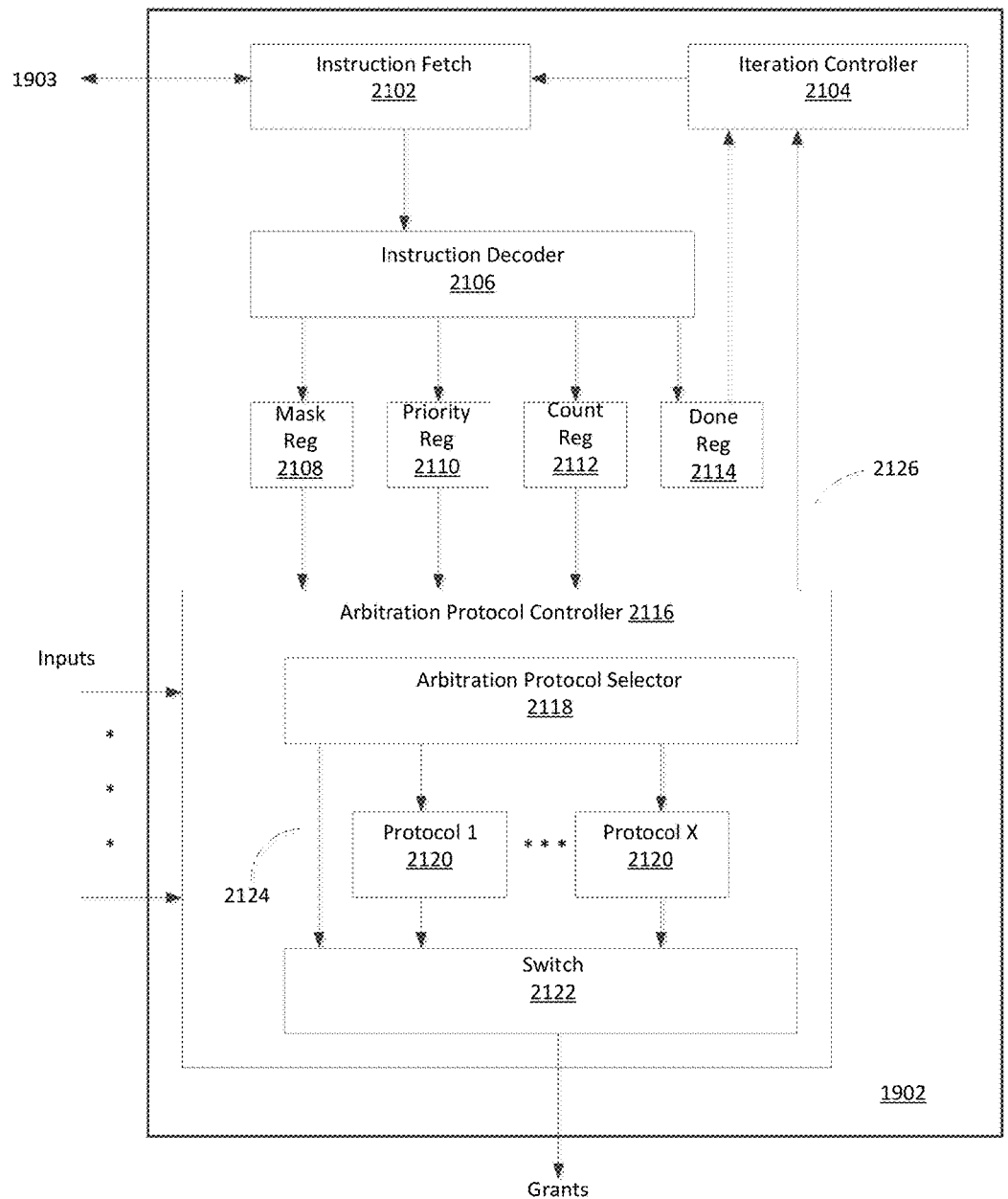
FIG. 21 is a schematic diagram showing the elements of the scripted arbitration controller, in accordance with various exemplary embodiments.

FIG. 21 is a schematic diagram showing the elements of the scripted arbitration controller 1902, in accordance with various exemplary embodiments. Among other things, the scripted arbitration controller 1902 includes an instruction fetch circuit 2102, an iteration controller circuit 2104, an instruction decoder circuit 2106, registers (2108, 2110, 2112, 2114), and an arbitration protocol controller circuit 2116.

Generally speaking, the iteration controller 2104 instructs the instruction fetch circuit 2102 to fetch the next script instruction from the script storage 1903, beginning with index 0 and incrementing the index each iteration until last script instructions is executed, as indicated by a value received from the Done register 2114. The instruction decoder 2106 decodes each instruction fetched by the instruction fetch circuit 2102 and stores the mask value from the instruction in the mask register 2108, stores the priority value from the instruction in the priority register 2110, stores the count value from the instruction in the count register 2112, and stores the done value from the instruction in the done register 2114.

The arbitration protocol controller 2116 executes the arbitration protocol specified in the script instruction. The arbitration protocol controller circuit 2116 includes an arbitration protocol selector circuit 2118, one or more arbitration protocol (algorithm) circuits 2120, and a switching circuit 2122. Generally speaking, the arbitration protocol selector 2118 outputs an algorithm select signal 2124 based on the value of the priority register 2110. In the example above, a non-zero value indicated a round-robin protocol while a zero value indicated an age-based protocol, although other values and other protocols may be supported in various alternative embodiments, and the arbitration protocol selector 2118 may receive feedback signals (not shown) from various arbitration protocol circuits 2120 to determine whether/when to select the default protocol. Each arbitration protocol circuit generally receives the inputs and arbitrates among the inputs based on values stored in the mask register 2108, the priority register 2110, and the count register 2112. For example, with reference again to FIG. 20, when executing the instruction corresponding to index 4, the age-based arbitration protocol circuit typically would run two iterations of age-based arbitration across sources 1-4. The switching circuit 2122 outputs the appropriate grants based on the algorithm select signal 2124 and the outputs from the selected arbitration protocol circuit. The arbitration protocol controller 2116 outputs a signal 2126 when the arbitration iteration is completed. Upon receiving the signal 2126, the iteration controller 2104 determines the next script instruction to be fetched and signals the instruction fetch circuit 2102 to fetch the next script instruction (e.g., if the value received from the Done register 2114 indicates that the last script instruction was executed, then the next script instruction would be index 0, otherwise the next script instruction would be the next index value).

Figure 22:
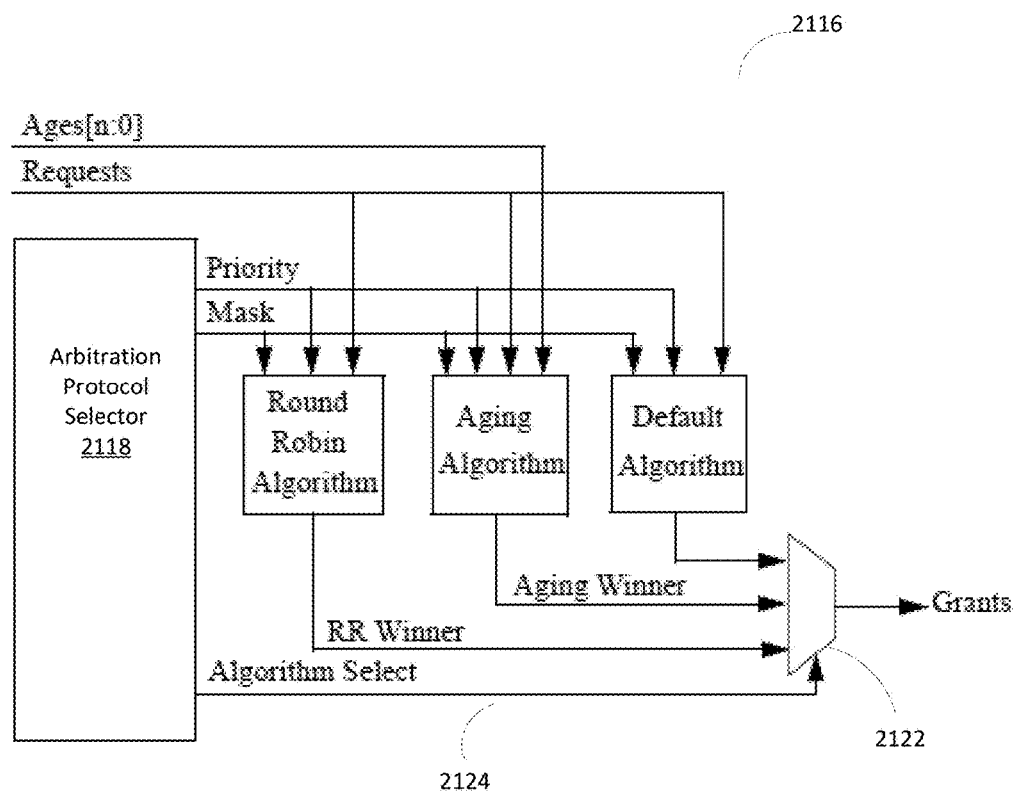
FIG. 22 is a schematic diagram showing additional details of the arbitration protocol controller 2116, in accordance with various exemplary embodiments.

FIG. 22 is a schematic diagram showing additional details of the arbitration protocol controller 2116, in accordance with various exemplary embodiments. Here, the arbitration protocol controller 2116 has separate circuits for each of a number of arbitration protocols/algorithms (in this example, a round-robin algorithm, an age-based algorithm, and a default algorithm) that are executed in parallel based on the priority and mask values provided by the arbitration protocol selector 2118. Based on the value stored in the priority register 2110, the arbitration protocol selector 2118 provides an algorithm select signal 2124 to the switching circuit 2122 to select the winner to be granted access in a given grant cycle. The arbitration protocol selector 2118 may receive feedback signals (not shown) from the round-robin algorithm and the age-based algorithm in order to determine when to select the default algorithm.

It should be noted that the scripted arbiter may be configured to run any of the arbitration schemes described herein, such as, for example, the age-based arbitration scheme described herein with reference to FIGS. 6-7 and/or the predictive arbitration scheme described herein with reference to FIGS. 8-9 and/or the shared-credit arbitration scheme described herein with reference to FIGS. 10-18. It should be noted that the count field of the exemplary script can facilitate implementation of the predictive arbitration scheme by providing multiple grant cycles in which to distribute accesses across multiple sources based on the number of competing sources.

Miscellaneous

Various exemplary embodiments may implement predictive arbitration, age-based arbitration, shared-credit arbitration, and/or scripted arbitration of the types described herein individually or in any combination including two or more of the types of arbitration.

Figure 23:
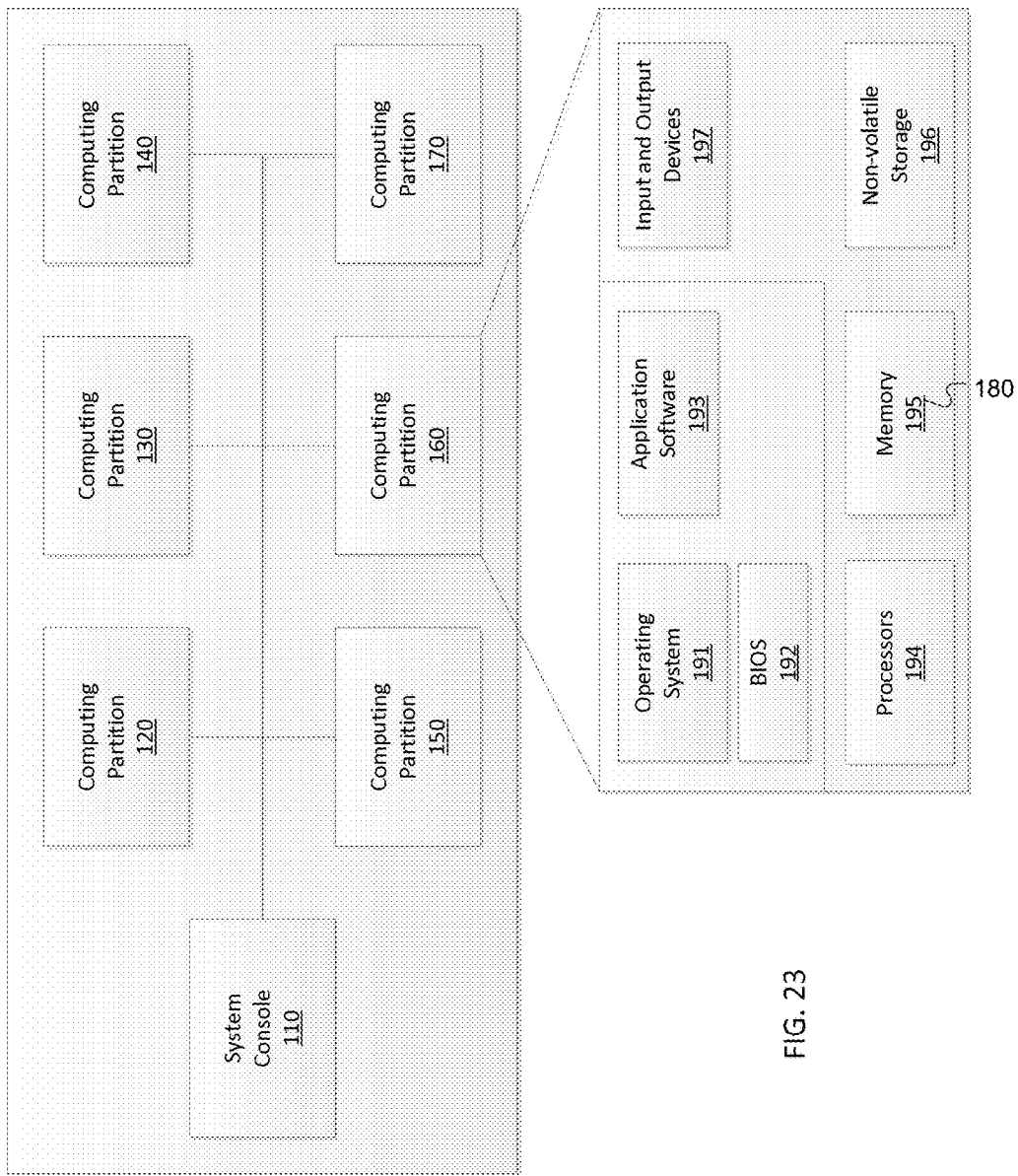
FIG. 23 schematically shows a logical view of an exemplary high-performance computing system that may be used with illustrative embodiments of the present invention.

Switching systems of the types described herein may be used to interconnect virtually any type or types of devices. In certain specific exemplary embodiments, the switching systems of the types described herein may be used to interconnect modular computing resources of a high-performance computing (HPC) system. FIG. 23 schematically shows a logical view of an exemplary high-performance computing system 100 that may be used with illustrative embodiments of the present invention. Specifically, as known by those in the art, a "high-performance computing system," or "HPC system," is a computing system having a plurality of modular computing resources that are tightly coupled using hardware interconnects, so that processors may access remote data directly using a common memory address space.

The HPC system 100 includes a number of logical computing partitions 120, 130, 140, 150, 160, 170 for providing computational resources, and a system console 110 for managing the plurality of partitions 120-170. A "computing partition" (or "partition") in an HPC system is an administrative allocation of computational resources that runs a single operating system instance and has a common memory address space. Partitions 120-170 may communicate with the system console 110 using a logical communication network 180. A system user, such as a scientist or engineer who desires to perform a calculation, may request computational resources from a system operator, who uses the system console 110 to allocate and manage those resources. Allocation of computational resources to partitions is described below. The HPC system 100 may have any number of computing partitions that are administratively assigned as described in more detail below, and often has only one partition that encompasses all of the available computing resources. Accordingly, this figure should not be seen as limiting the scope of the invention.

Each computing partition, such as partition 160, may be viewed logically as if it were a single computing device, akin to a desktop computer. Thus, the partition 160 may execute software, including a single operating system ("OS") instance 191 that uses a basic input/output system ("BIOS") 192 as these are used together in the art, and application software 193 for one or more system users.

Accordingly, as also shown in FIG. 23, a computing partition has various hardware allocated to it by a system operator, including one or more processors 194, volatile memory 195, non-volatile storage 196, and input and output ("I/O") devices 197 (e.g., network ports, video display devices, keyboards, and the like). However, in HPC systems like the embodiment in FIG. 23, each computing partition has a great deal more processing power and memory than a typical desktop computer. The OS software may include, for example, a Windows® operating system by Microsoft Corporation of Redmond, Wash., or a Linux operating system. Moreover, although the BIOS may be provided as firmware by a hardware manufacturer, such as Intel Corporation of Santa Clara, Calif., it is typically customized according to the needs of the HPC system designer to support high-performance computing.

As part of its system management role, the system console 110 acts as an interface between the computing capabilities of the computing partitions 120-170 and the system operator or other computing systems. To that end, the system console 110 issues commands to the HPC system hardware and software on behalf of the system operator that permit, among other things: 1) booting the hardware, 2) dividing the system computing resources into computing partitions, 3) initializing the partitions, 4) monitoring the health of each partition and any hardware or software errors generated therein, 5) distributing operating systems and application software to the various partitions, 6) causing the operating systems and software to execute, 7) backing up the state of the partition or software therein, 8) shutting down application software, and 9) shutting down a computing partition or the entire HPC system 100.

Additional details of certain exemplary HPC systems can be found in U.S. Pat. No. 9,237,093 entitled BANDWIDTH ON-DEMAND ADAPTIVE ROUTING, which is hereby incorporated herein by reference in its entirety.

While the various aspects of the invention are described through the above-described exemplary embodiments, it should be noted that modifications to, and variations of, the illustrated embodiments may be made without departing from the inventive concepts disclosed herein. Furthermore, disclosed aspects, or portions of these aspects, may be combined in ways not listed above and/or not explicitly claimed. Accordingly, the invention should not be viewed as being limited to the disclosed embodiments.

Although certain aspects of various exemplary embodiments may have been described with reference to flowcharts and/or block diagrams, it should be noted that functions, operations, decisions, etc. of all or a portion of each block, or a combination of blocks, may be combined, separated into separate operations, or performed in other orders in some situations. All or a portion of each block, or a combination of blocks, may be implemented as computer program instructions (such as software), hardware (such as combinatorial logic, Application Specific Integrated Circuits (ASICs), Field-Programmable Gate Arrays (FPGAs) or other hardware), firmware or combinations thereof. Some embodiments may be implemented by a processor executing, or controlled by, instructions stored in a memory. The memory may be random access memory (RAM), read-only memory (ROM), flash memory or any other memory, or combination thereof, suitable for storing control software or other instructions and data. Instructions defining the functions of the present invention may be delivered to a processor in many forms, including, but not limited to, information permanently stored on tangible, non-transitory, non-writable storage media (e.g., read-only memory devices within a computer, such as ROM, or devices readable by a computer I/O attachment, such as CD-ROM or DVD disks), information alterably stored on tangible, non-transitory, writable storage media (e.g., floppy disks, removable flash memory and hard drives) or information conveyed to a computer through a communication medium, including wired or wireless computer networks.

Although the above discussion discloses various exemplary embodiments of the invention, it should be apparent that those skilled in the art can make various modifications that will achieve some of the advantages of the invention without departing from the true scope of the invention.

What is claimed is:

1. An apparatus for providing access by a plurality of virtual channels to a shared resource, the apparatus comprising:
    a shared resource;
    at least one packet interface providing the plurality of virtual channels; and
    an arbiter configured to logically divide the shared resource into a plurality of dedicated resource pools and a shared resource pool with each dedicated resource pool associated with a distinct virtual channel, allocate credits to each virtual channel, receive from a source associated with a virtual channel a packet for the virtual channel, determine whether to use the dedicated resource pool associated with the virtual channel or the shared resource pool for the packet, and when the shared resource pool is used for the packet, return a credit back to the source without waiting for the shared resource used for the packet to be freed.

2. An apparatus according to claim 1, wherein the virtual channels are separate physical channels associated with separate packet interfaces.

3. An apparatus according to claim 1, wherein the virtual channels are logical channels on a single packet interface.

4. An apparatus according to claim 1, wherein the shared resource is a memory.

5. An apparatus according to claim 4, wherein the memory is a Dynamically Allocated Memory Queue (DAMQ) buffer.

6. An apparatus according to claim 4, wherein the packets are data packets to be stored in the memory.

7. An apparatus according to claim 1, wherein the shared resource is a communication interface, and wherein the packets are data packets to be transmitted over the communication interface.

8. An arbiter for arbitrating access by a plurality of virtual channels to a shared resource, the arbiter comprising:
    at least one packet interface providing the plurality of virtual channels; and
    a shared-credit arbitration circuit configured to logically divide the shared resource into a plurality of dedicated resource pools and a shared resource pool with each dedicated resource pool associated with a distinct virtual channel, allocate credits to each virtual channel, receive from a source associated with a virtual channel a packet for the virtual channel, determine whether to use the dedicated resource pool associated with the virtual channel or the shared resource pool for the packet, and when the shared resource pool is used for the packet, return a credit back to the source without waiting for the packet to be freed from the shared resource pool.

9. An arbiter according to claim 8, wherein the virtual channels are separate physical channels associated with separate packet interfaces.

10. An arbiter according to claim 8, wherein the virtual channels are logical channels on a single packet interface.

11. An arbiter according to claim 8, wherein the shared resource is a memory.

12. An arbiter according to claim 11, wherein the memory is a Dynamically Allocated Memory Queue (DAMQ) buffer.

13. An arbiter according to claim 11, wherein the packets are data packets to be stored in the memory.

14. An arbiter according to claim 8, wherein the shared resource is a communication interface, and wherein the packets are data packets to be transmitted over the communication interface.

15. A method for providing access by a plurality of virtual channels to a shared resource, the method comprising:
    logically dividing a shared resource into a plurality of dedicated resource pools and a shared resource pool with each dedicated resource pool associated with a distinct virtual channel;
    allocating credits to each virtual channel;

receiving from a source associated with a virtual channel a packet for the virtual channel;

determining whether to use the dedicated resource pool associated with the virtual channel or the shared resource pool for the packet; and when the shared resource pool is used for the packet, returning a credit back to the source without waiting for the packet to be freed from the shared resource pool.

16. A method according to claim 15, wherein the virtual channels are separate physical channels associated with separate packet interfaces.

17. An apparatus according to claim 15, wherein the virtual channels are logical channels on a single packet interface.

18. A method according to claim 15, wherein the shared resource is a memory, and wherein the method further comprises storing the packet in the memory.

19. A method according to claim 18, wherein the memory is a Dynamically Allocated Memory Queue (DAMQ) buffer.

20. A method according to claim 18, wherein the packets are data packets to be stored in the memory.

21. A method according to claim 15, wherein the shared resource is a communication interface, and wherein the method further comprises transmitting the packet over the communication interface.

* * * * *